United States Patent
Hilemon et al.

(10) Patent No.: US 10,534,633 B2
(45) Date of Patent: Jan. 14, 2020

(54) EXTENSIBLE ASSET CLASSES IN A MONITORING SYSTEM HAVING A COMMON PLATFORM

(71) Applicant: COMPUTATIONAL SYSTEMS, INC., Knoxville, TN (US)

(72) Inventors: Christopher G. Hilemon, Knoxville, TN (US); Anthony J. Hayzen, Knoxville, TN (US); William L. Sells, Knoxville, TN (US); Viva C. Williams, Knoxville, TN (US); David Bass, Knoxville, TN (US); Trevor D. Schleiss, Austin, TX (US); Manikandan Janardhanan, Knoxville, TN (US)

(73) Assignee: COMPUTATIONAL SYSTEMS, INC., Knoxville, TN (US)

( * ) Notice: Subject to any disclaimer, the term of this patent is extended or adjusted under 35 U.S.C. 154(b) by 208 days.

(21) Appl. No.: 15/238,978

(22) Filed: Aug. 17, 2016

(65) Prior Publication Data
US 2017/0102961 A1   Apr. 13, 2017

Related U.S. Application Data

(60) Provisional application No. 62/240,289, filed on Oct. 12, 2015.

(51) Int. Cl.
*G06F 9/46* (2006.01)

(52) U.S. Cl.
CPC .................... *G06F 9/465* (2013.01)

(58) Field of Classification Search
CPC ................... G06F 9/46; G06F 9/465
See application file for complete search history.

(56) References Cited

U.S. PATENT DOCUMENTS

| | | | | |
|---|---|---|---|---|
| 7,401,131 B2 * | 7/2008 | Robertson | ............ | G06Q 10/10 |
| | | | | 707/999.01 |
| 7,458,082 B1 * | 11/2008 | Slaughter | ............ | G06F 9/547 |
| | | | | 713/153 |
| 2005/0075914 A1 * | 4/2005 | Bayne | ............ | G06Q 10/06 |
| | | | | 700/96 |

(Continued)

*Primary Examiner* — Tuan C Dao
(74) *Attorney, Agent, or Firm* — Marshall, Gerstein & Borun LLP

(57) ABSTRACT

An application software platform is provided for use in a process plant or other environment to enable various different applications to run, to obtain access to, and to use data from various different assets in the plant or other asset environment in a consistent and easily understood manner. The software platform includes a class-based object structure or model that is set up and used to organize and to efficiently provide access to data about, generated by, or obtained from the assets in the plant. This class-based object structure may be used to provide efficient and organized communications between the various monitoring or other applications and the plant assets or sources of data. The class-based object structure is extensible and includes or defines various hierarchies of class objects that, in turn, define various levels of the assets or other physical or logic entities being monitored (i.e., from which or about which data is being obtained), as well as properties and behaviors of the assets or physical or logical entities being monitored.

79 Claims, 6 Drawing Sheets

(56) References Cited

U.S. PATENT DOCUMENTS

| | | | |
|---|---|---|---|
| 2006/0025987 A1* | 2/2006 | Baisley | G06F 17/271 704/4 |
| 2006/0206861 A1* | 9/2006 | Shenfield | G06F 8/35 717/106 |
| 2006/0277289 A1* | 12/2006 | Bayliss | H04L 67/12 709/223 |
| 2007/0282916 A1* | 12/2007 | Albahari | G06F 17/3056 |
| 2009/0164197 A1* | 6/2009 | Matthews | G06F 17/5068 703/15 |
| 2009/0319993 A1* | 12/2009 | Denver | G06F 8/24 717/121 |
| 2010/0257539 A1* | 10/2010 | Narayanan | G06F 9/44526 719/311 |
| 2014/0109037 A1* | 4/2014 | Ouali | G06F 8/10 717/105 |
| 2016/0092339 A1* | 3/2016 | Straub | G06F 9/44521 717/124 |

* cited by examiner

EXTENSIBLE ASSET CLASSES IN A MONITORING SYSTEM HAVING A COMMON PLATFORM

CROSS REFERENCE TO RELATED APPLICATIONS

This application claims priority to U.S. Provisional Patent Application Ser. No. 62/240,289, entitled "Extensible Asset Classes in a Monitoring System Having a Common Framework," which was filed on Oct. 12, 2015, the entire disclosure of which is hereby expressly incorporated by reference herein.

FIELD

The present application relates to the use of extensible object classes in an electronic monitoring system having a common software platform infrastructure communicating with a variety of assets and asset monitoring applications.

BACKGROUND

Electronic monitoring systems are used to monitor and in some cases configure and control assets. For example, an electronic monitoring system may be used in a plant, such as a process plant, a power plant, etc., having numerous pieces of machinery and other equipment that need to be monitored. The plant may include motors, pumps, heat exchangers, valves, and other devices, all of which may be generically called "assets," and one or more monitoring devices (which are also assets) that may be attached to or associated with each of these assets for monitoring one or more parameters of the associated assets. The monitoring devices may be grouped together and serviced by different computer applications. For example, there might be one application for vibration monitoring, another application for temperature monitoring and yet another application for monitoring the position and operation of valves within a plant. Still other applications may be associated with performing various types of analysis on the assets or using data provided by the assets. Each of these applications may produce a tremendous amount of data. As an example, the applications may identify important occurrences which may be generically called "events." An event may be, for example, a temperature that is too high, a valve that is operating improperly, or the detection of a failed sensor. An event may also be representative of a physical thing such as the detection of vibration in a motor that exceeds an alarm level. In any case, these events generally need to be reported to one or more users, such as plant operators, maintenance personnel, monitoring personnel, etc., and each application will have some strategy for reporting such events. Thus, as will be understood, various different monitoring applications may access and use data from different assets, from some of the same assets or from various sets of overlapping assets. A vibration monitoring application, for example, may need to access data from or about some of the same assets as an oil monitoring application. However, as the various monitoring applications may be developed by different developers, and may be primarily designed for use by different persons in a process plant or in another asset environment, there is typically no current structure within a plant that allows the various monitoring applications to efficiently operate to obtain and use the plant data needed by these applications.

SUMMARY

An application software platform is provided for use in a process plant or other asset environment to enable various different applications (such as monitoring applications) to execute, to obtain access to, and to use data from or about various different assets in the plant or other asset environment in a consistent and easily configurable manner. The software platform may be implemented in a distributed computing network including one or more servers coupled to one or more users (client devices) that execute various monitoring or other applications that use data provided via the platform to perform various functions, such as analysis functions, operation functions, maintenance functions, monitoring functions, etc. The one or more servers may be connected to the one or more client devices via any desired communication network, and may also be connected to assets, such as devices within a plant or other monitored environment, via the same or different communication networks.

The software platform includes a class-based object structure or model that is set up and used to organize and to efficiently provide access to data about, generated by, or obtained from the assets in the plant. This class-based object structure may be used to provide efficient and organized communications between the various monitoring or other applications and the plant assets or sources of data. In one example, the class-based object structure may include or define various hierarchies of class objects that, in turn, define various levels of the assets or other physical or logic entities being monitored (i.e., from which or about which data is being obtained) as well as the properties and behaviors of these assets or physical or logical entities. The properties and behaviors may include, for example, definitions of the data available from or about the assets or other physical or logical entries being monitored, manners or paths for obtaining this data, etc. Moreover, the class-based object structure is extensible, in that the various applications may register with the software platform and force changes to the class-based object structure by, for example, defining new types of class objects within the hierarchy, new instances of class objects, new properties of class objects or instances thereof, add-on objects that are to be connected to or to be associated with various different class objects or instances thereof, relationships between various different class objects or instances thereof within the hierarchy, etc.

The definition, storage, and use of these extensible asset classes (referred to as a model) within the platform provides for a consistent, manageable, and easily understood structure for use by the platform when obtaining data from or about the various asset devices (i.e., via platform services), storing such data, providing information to various applications about what data or other information is available about or from the various asset devices, storing information defining various interrelationships between the various asset devices, etc., all in a manner that reduces or optimizes communications between the various asset devices and the applications. This structure can thus be used to support many different monitoring applications that need to access and use different asset data for different functions. Moreover, the asset model used by the software platform is, at a basic level, predefined, and is thus consistent across multiple asset environments in which the software platform is used. This feature enables or assures consistent model definitions for the same types of assets at different plants, at different customer sites, etc., thereby assuring consistency in the definitions and the uses of the model in unconnected or separate asset environments which may be monitored or managed by the same user or users.

As one example, in a large monitoring system where numerous monitors are placed on numerous assets governed by numerous applications, a large number of events may be reported and such events may create messages (also called alerts) that are electronically directed to users of the various monitoring applications. Such users may be any person using a particular application, such as maintenance personnel, reliability personnel, plant operators, etc. To enable more optimal distribution of these alerts, the platform may define a number of monitoring asset classes, with each asset class having one or more instances that represent or are bound to particular monitoring devices within the plant. The alerts may be defined as being associated with one or more of the various asset class objects or with instances of the various asset class objects and may indicate the user, application, or other destination to which an alert should be directed. Moreover, the various different monitoring applications that are receiving one or more alerts may initially define new asset classes, or may modify one or more of the asset classes within the platform to define alerts (or other data) needed by or used by the application. Once the asset classes are defined and the platform apparatus or computer is communicatively coupled to the assets themselves, the platform services may use the asset class objects and instances to thereby obtain, generate, and/or manage the alerts (based on other data from the asset devices). The platform services may, for example, to determine the destination of the alerts in any particular instance. This destination may be, for example, an application such as a monitoring application, a user, a monitoring device, etc. In other cases, the platform services may simply broadcast alerts without knowing particular destinations or users of the alerts, and the applications, users, computer devices, etc. within the asset environment may subscribe to the alerts on an as needed basis. Still further, applications may use or tie into asset class objects that are already created or defined in the platform to obtain data from assets via the platform services. The management of alerts is but one example of the manner in which the platform may use the asset object model to support various applications that use asset data to perform functions.

As one example, an electronic communication system, for use in an environment having a plurality of physical assets of different types and uses, includes a processor, a memory, a communication interface, an object model stored in the memory, and a multiplicity of platform services coupled to the communication interface that execute on the processor to receive and process messages from one or more applications. The object model includes one or more class objects, each of which is indicative of a physical or logical entity within the asset environment, and each of which includes one or more features defining one or more aspects of a physical or logical entity within the asset environment, the features having feature fields indicating data to be stored for each of the features. Still further, one or more of the multiplicity of platform services uses the object model to perform actions with respect to the messages from the one or more applications, such as obtaining data from or about the assets, reading data to or writing data from one or more of the assets or databases associated with one or more of the assets, responding to queries from the one or more applications about data in the object model, etc.

If desired, at least one of the platform services manages the object model by enabling the object model to be extended to include additional object information defining additional information about physical or logical entities in the asset environment. Moreover, if desired, the object model may store a plurality of asset class objects (each asset class object representing a type of a physical asset within the asset environment), a plurality of location class objects (each location class object representing a type of a location within the asset environment), a plurality of host class objects (each host class object representing a type of a host computer or device associated with the asset environment), and/or a plurality of route class objects (each route class object representing a type of a route within the asset environment).

In some cases, the object model stores a plurality of asset class objects, each asset class object representing a type of a physical asset within the asset environment and the object model stores one or more asset object instances for one of the asset class objects, wherein each of the asset object instances includes the features of one of the asset class objects and includes asset data defining a particular asset within the asset environment within the feature fields of the asset object instance. One or more of the plurality of asset class objects may be a sub-class object of another one of the plurality of asset class objects and the sub-class object may include all of the features of the another one of the plurality of asset class objects. Still further, at least one of the platform services may manage the object model by enabling the object model to be extended to include one or more additional asset class objects defining additional information about a type of asset in the asset environment, or to include additional features of an asset class object. If desired, the platform services may manage the object model by storing an indication of an application that extended the object model to include an additional feature in one of the asset class objects, or may store an indication of multiple applications associated with an additional feature of an asset class object that has been extended in the object model. In these cases, for example, the platform services may limit access to the additional feature of the extended asset class object, or any asset class object instances created therefrom, to one or more applications stored in the asset class object or asset class object instances created therefrom as being associated with the additional feature.

Likewise, the object model may include one or more add-on objects, wherein each of the one or more add-on objects includes a set of features defining asset information, and wherein one or more of the add-on objects is associated with one or more of the asset class objects or instances of the one or more asset class objects to further define the asset associated with the one or more asset class objects or instances of the one or more asset class objects. Likewise, at least one of the asset class objects may include a list of add-on objects defining the add-on objects that may be associated with asset class object instances of the at least one of the asset class objects and the platform services may manage the object model to prevent the association of an add-on object with an asset class object instance of an asset class object when the add-on object is not within the list of add-on objects of the asset class object. On the other hand, or additionally, at least one of the asset class objects may include a list of add-on objects defining the add-on objects that must be associated with asset class object instances of the at least one of the asset class objects.

Still further, the object model may include one or more relationship definitions, wherein each relationship definition defines a relationship between two or more class objects. As examples, the relationship definitions may define a controlled-by relationship in which an asset associated with a first asset object instance is controlled by an asset associated with a second asset object instance; an is-controlling relationship in which an asset associated with a first asset object instance is controlling an asset associated with a second asset object instance; a monitored-by relationship in which an asset associated with a first asset object instance is monitored by an asset associated with a second asset object instance; or an is-monitoring relationship in which an asset associated with a first asset object instance is monitoring an asset associated with a second asset object instance. Likewise, the relationship definitions may define a roll-up relationship in which data from one or more child asset object instances is to be used by or associated with the parent asset object instance for a particular purpose; a relay relationship in which a first asset object instance provides information, such as alerts or other messages, to a second asset object instance; and a bound-to relationship in which a first asset object instance is created as a placeholder asset object instance and is enabled, at a later time, to be bound to a particular asset within the asset environment by obtaining data for the features of the placeholder asset object instance from a data source of the particular asset within the asset environment.

In another example, a method of performing communications in an electronic communication system supporting an environment having a plurality of physical assets of different types and uses, includes storing an object model in an electronic memory, the object model including one or more class objects, each of the one or more class objects being indicative of a physical or logical entity within the asset environment, each of the class objects including one or more features defining one or more features of a physical or logical entity within the asset environment, and feature fields for data to be stored for each of the features. The communication method also includes executing, via a processor, a communication interface to communicate with one or more external applications and includes executing, via a processor, a multiplicity of platform services to receive and process messages from the one or more external applications, further including causing one or more of the multiplicity of platform services to use the object model to perform actions with respect to messages from the one or more external applications. Still further, the method may include executing, via a processor, at least one of the platform services to manage the object model by enabling the object model to be extended to include additional object information defining additional information about physical or logical entities in the asset environment.

In still another example, an electronic communication system, for use in an environment having a plurality of physical assets of different types and uses, includes a processor, a memory, a communication interface, an object model stored in the memory, and a multiplicity of platform services coupled to the communication interface that execute on the processor to receive and process messages from one or more applications, the messages being received via the communication interface. In this system, the one or more of the multiplicity of platform services uses the object model to perform actions with respect to messages from the one or more applications. Moreover, the object model includes a plurality of asset objects, each of the plurality of asset objects being indicative of a physical asset within the asset environment and including one or more features defining one or more features of an asset within the asset environment. The object model also includes one or more relationship definitions, each of the one or more relationship definitions indicating a relationship between two or more asset objects.

BRIEF DESCRIPTION OF THE DRAWINGS

Further advantages of the invention are apparent by reference to the detailed description when considered in conjunction with the figures.

DETAILED DESCRIPTION

Figure 1:
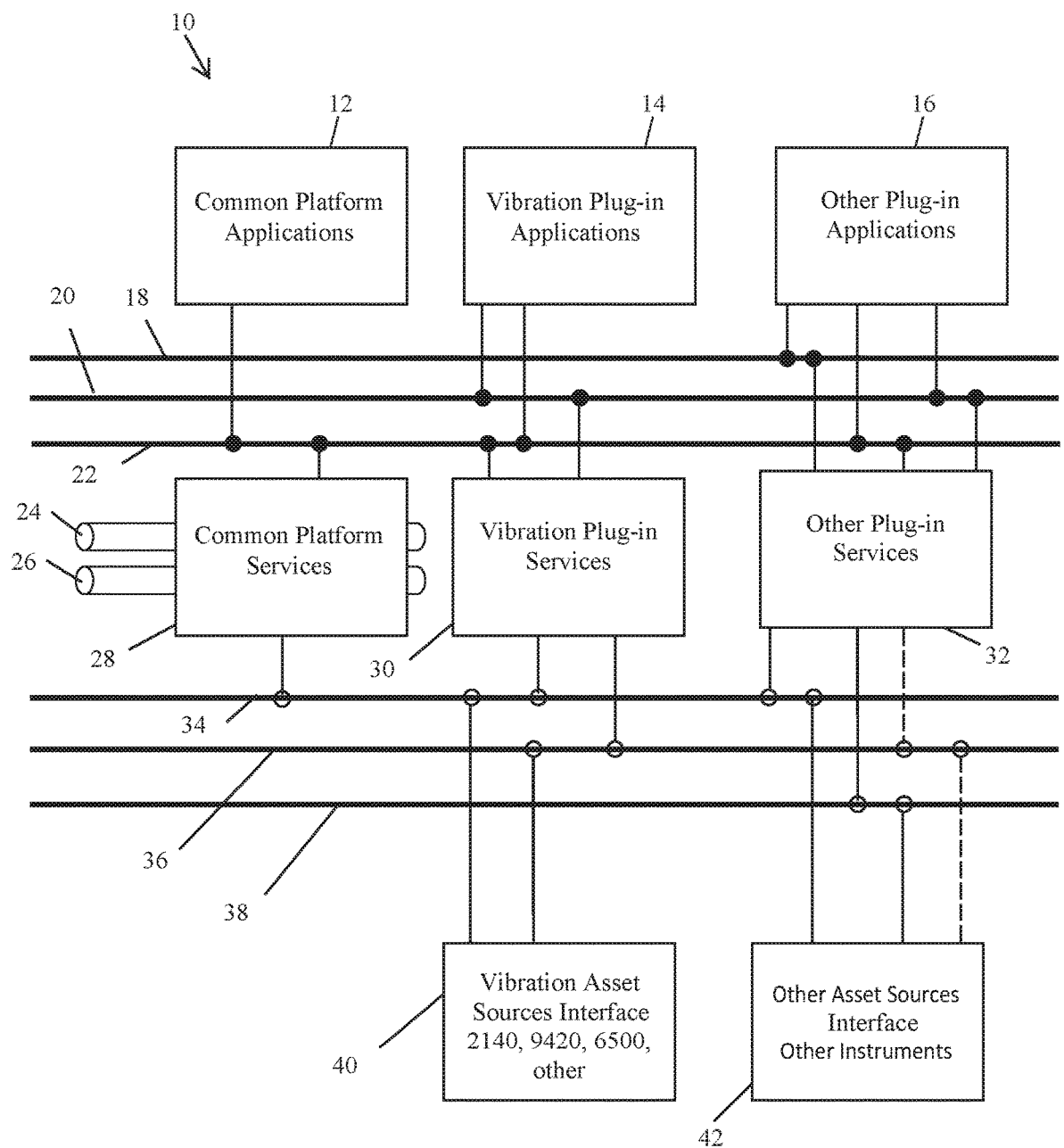
FIG. 1 is a diagrammatic illustration of a computer apparatus in which an extensible class-based platform structure or model can may be implemented.

A system and method of implementing a distributed computing environment via a computer apparatus 10 having a platform that uses a class-based object structure or model, and in particular an asset class-based object structure, is illustrated in FIG. 1. The computer apparatus 10 of FIG. 1 is illustrated as a local hardwired computer network, but may be implemented as any desired type of computer network such as a distributed computing and/or communication network, a web-based or Internet based network, etc. Generally speaking, the computer apparatus 10 may provide for or assist in implementing communications throughout one or more plants (such as process plants) or other asset environments in order to, for example, monitor and/or control various assets, such as machinery, control devices (including valves, boilers, heat exchangers, etc.), pipelines, motors, monitoring devices (such as sensors, monitoring data collection devices, vibration detection devices, etc.) and other types of assets. Such assets may relate to or be involved with controlling and/or monitoring liquids, fluids, solids, other devices or equipment, etc. While, in a general sense, the class-based computing and communication structure described herein will be described in the context of being used in one or more process plants having process control and monitoring equipment, this class-based computing and communication network or apparatus can be used in any other environment to monitor and/or control other types of assets or devices, including for example, assets in industrial manufacturing plants, power plants, agricultural farms or plants, oil and gas drilling and collection platforms, etc.

As illustrated in FIG. 1, the computer apparatus 10 includes a set of platform applications (referred to herein as common platform applications 12, which are connected to a set of common platform services 28 via a common platform API (application program interface) 22. The platform services 28 includes a services bus 24 and a data highway bus 26 which may be used to provide platform services data or information and other data to one or more other users. The aforementioned "platform" elements are collectively referred to as the platform infrastructure. Generally speaking the platform infrastructure may be provided to enable the platform applications 12 to obtain access to data or other information about or from one or more assets, such as assets in the plant, in a consistent and easily understood manner, thereby allowing or enabling various different application developers to develop applications for use in or with a plant, without having to know or understand how data within the plant is generated, stored, or otherwise organized and accessed.

In a typical application environment, such as in a process or other manufacturing plant, numerous applications, services and buses are provided external to the platform infrastructure. For example, vibration plug-in applications 14 may be connected to a vibration API 20 and the common platform API 22. Likewise other plug-in applications 16 may be provided and connected to the common platform API 22 and to other plug-in APIs 18. Still further, other plug-in services 32 may be connected to all three API's 22, 20 and 18. The "other" elements will be understood to represent numerous other applications, services, and buses that may be provided in this particular computer apparatus 10 to interface with the common platform services 28 to obtain data from various assets.

Importantly, the common platform services 28 is connected to asset sources 40 (which may be vibration asset sources) and other asset sources 42, both of which are connected through the platform web API 34. The asset sources 40 are also connected to an API 36 through which the various sources may communicate to each other. As an example, the asset sources 40 may include vibration sources such as vibration collecting and monitoring devices such as models 2140, 9420, 6500, and others provided by Emerson® Process Management. The vibration asset sources 40 may communicate through the API 36 with the vibration plug-in services 30, and the other asset sources 42 may communicate with the other plug-in services 32 through the other API 38. In this particular example, the other plug-in services 32 and the other asset sources 42 are connected to all three APIs 34, 36 and 38, which may be desirable, but is optional. In general, the applications, such as the vibration plug-in web application 14 and the sources, such as the sources 40, will not interface with other applications or other services. Instead, everything will communicate to the common platform services 28 and communications between applications or between sources will be accomplished through the common platform services APIs 22 and 34.

It will be understood that all asset sources, such as the sources 40 and 42 may communicate indirectly with the applications 12, 14, 16 through or using the common platform services 28. For example, when something important happens as determined by the asset sources 40 and 42, an event signal may be generated by one of the asset sources 40 and 42 and this signal may communicated through the common platform services 28 to, for example, a messaging application within the common platform web applications 12. Thus, in general, event signals are generated outside of the platform infrastructure and messages are generated by a messaging service within the platform infrastructure. Likewise, other asset data or signals may be provided from any of the assets sources 40 and 42 to any of the applications 12, 14, 16 using the common platform services 28 either in response to a read request from (via) the common platform services 28 or because the asset sources 40 and 42 are configured to automatically send such data or signals via, for example, to broadcast messages to which various ones of the applications 12, 14, 16, subscribe via the platform services 28. Such data may include performance data, control data, maintenance data, sensed data, process variable data, measured data, device information data, configuration data, etc.

Moreover, it will be understood that the asset sources 40, 42 may be individual devices such as monitoring devices, data collection devices coupled to sensors or other monitoring devices, individual control devices such as controllers, valves, heat exchangers, etc., may be databases that collect and store asset data of any type from other assets (such as monitoring, process control, and maintenance databases within process plants that collect and store control and maintenance data generated within the plant), or may be gateways into interconnected plant systems, such as control systems, maintenance systems, etc. Thus, the asset sources 40, 42, of FIG. 1 can be any source of asset data that is coupled to one or more assets, directly or indirectly, to obtain data of any kind. Asset data may, for example, be data generated by, stored within, stored about or collected by an asset.

Figure 2:
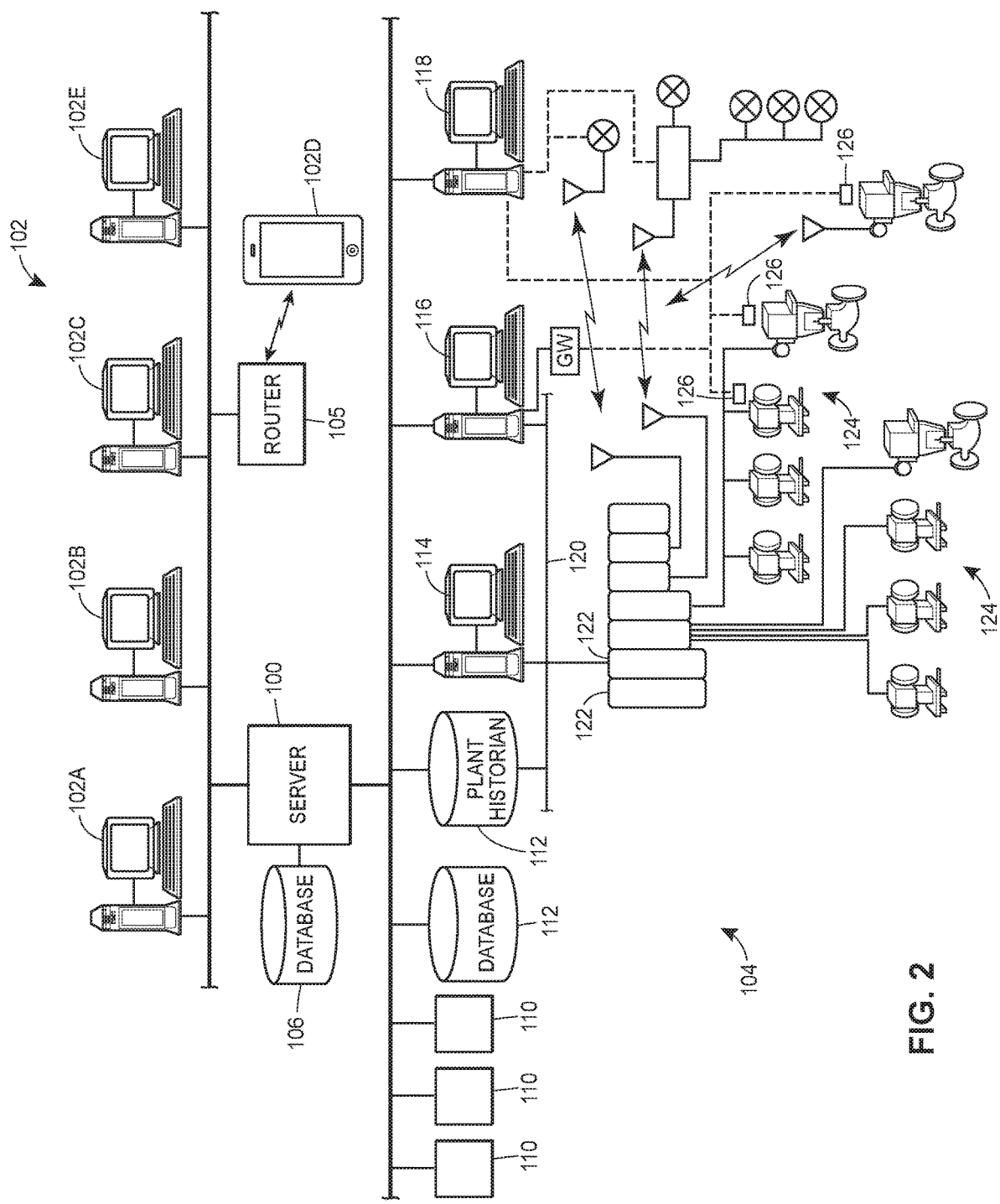
FIG. 2 is a diagram of a computer network including a server, a database, a set of client computer devices, a set of asset sources, and a set of assets, in which an extensible class-based platform structure or model may be implemented to perform communications.

FIG. 2 illustrates a distributed computing system in which the computer apparatus 10 of FIG. 1 may be used or implemented to provide access to various different types of assets or asset data, via various computer network connections. In particular, the distributed computing system of FIG. 2 includes a server 100 (which may be a set of any number of server devices having processors and communication circuitry therein) connected to various client computing devices 102 and to various sources of asset data 104. In particular, the server 100 may store and execute various ones of the platform services 28, the plug-in services such as the vibration services 30 or other plug-in services 32 of FIG. 1. Likewise, the client devices 102, which may be any types of computing devices such as personal computers, laptop computers, handheld computers, other servers, phones, tablets, etc., having processors therein, may store and execute any of the platform applications 12, and/or other plug-ins or applications 14 and 16 of FIG. 1. If desired, some are all of the applications 12, 14, 16 may be stored in and executed in the server 100 and these applications may communicate with the client devices 102 as user interface devices. Of course, the client devices 102 may include user interfaces and/or displays to enable users to interact with the applications stored and executed thereon or otherwise in communication with these devices. Still further, while the server 100 is illustrated as being connected to the client devices 102 via one or more hardwired communication networks (such as an Ethernet network connection, a web based network connection like the Internet, etc.), the client devices 102 may be connected to the server 100 via any desired hardwired or wireless (or combined hardwired and wireless) communication network. Thus for example, one of the client devices 102D is illustrated as a handheld, wireless device that is connected to the server 100 via a wireless router 105 which is connected to the server 100 via a hardwired communication network.

Moreover, the server 100 may include or be connected to one or more databases 106 which store data obtained by, generated by, and/or used by the platform services 28 to provide data collection and organization with respect to various ones of the applications (plug-ins) within or accessible via the client devices 102. Still further, as illustrated in FIG. 2, the server 100 is connected, via any desired communication network or networks (e.g., wired and/or wireless), to various asset sources 104. In the example system of FIG. 2, the asset sources 104 may include individual monitoring devices 110 (which may be or may collect data from various sensors disposed in, for example, a plant), databases 112 (which may collect and store data received from other assets or devices), process plants computers or interfaces, such as a plant control interface 114, a process maintenance interface 116, a plant monitoring interface 118, etc. Any or all of the plant interfaces 114, 116, 118 may be coupled via various communication networks to devices within a plant, such as a process plant, a power plant, etc., and these interfaces may operate to collect asset data from plant devices or assets in any known or traditional manner. For example, the control interface 114 may be connected via a plant control network 120 to various controllers 122, which may be connected via input/output devices and any desired or known wired or wireless communication links (such as HART® communication links, Foundation® Fieldbus communication links, wireless communication links like WirelessHART® communication links) to field devices and other plant devices 124, like valves, sensors, transmitters, burners, heat exchangers, motors, etc. Moreover, the maintenance interface 116 may be connected to various ones of the field devices 124 via the plant control network 120 and/or may be connected to these and other maintenance devices 126 (which may be monitoring devices like vibration monitoring devices) within the plant via a stand-alone or separate maintenance communication network. In a similar manner, the monitoring interface 118 may be connected to various monitoring devices, such as vibration monitoring devices 126, etc. via any installed or ad hoc communication network or link. As will be understood, the asset sources 110, 112, 114, 116, 118, 122, 124, 126, etc. of FIG. 2 may any of the sources 40 and 42 of FIG. 1. Moreover, the asset sources illustrated in FIGS. 1 and 2 are but a few of the possible types of asset sources that may be connected to the platform services 28 within the server 100.

Generally speaking, the platform services 28 of FIG. 1 will operate to assist in performing communications between applications and asset sources and to organize asset data acquisition and use by implementing an extensible asset class (EAC) structure or model (referred to herein as an extensible model or apparatus) which, in turn, describes or defines various types of assets (or other physical or logical entities) and classifies these assets (or other physical or logical entities) into a logical structure that models real-world assets, such as any of the asset sources of FIG. 2. In one case, the model, also referred to herein as an object model, includes a set of classes or class objects that represent or define different types of entities, such as assets, within the plant or other environment. The classes are defined using objects which may be created, implemented, and stored as objects in an object-oriented computing environment or language if so desired. Each asset class object uniquely defines a set of properties and behaviors associated with a particular type of real world asset at some level of abstraction. Moreover, the asset class objects of the model are arranged into a hierarchical structure, such as a parent/child structure. The purpose of this hierarchical structure is to arrange the asset classes in a logical and easily understood manner for use by applications (such as plug-ins), and to provide for inheritance of properties and behaviors from a parent class to its sub-classes (child classes). The sub-classes or child classes that are created from a parent class object may have additional unique properties and behaviors of their own to further define a sub-set of assets that fall under the parent class object definition. Thus, in general, the parent classes are a generalization of their more specific sub-classes. For example, a sub-class "Pump" is more specific than its parent class, "Machine", and a sub-class "Machine" is more specific than its parent class, "Asset".

While the class object definitions included within and used by the platform services 28 may go beyond just assets and may include other physical or logical entities, such as locations, routes, and hosts, to mention a few, this description focuses primarily on the asset type of class objects, it being understood that other types of classes and class objects can be used by the platform services 28 and that these other types of class objects can possess similar behavior as described herein for the asset class objects. Moreover, it will be understood that the asset class object structure or hierarchy described herein is designed for extensibility so that this structure can be added to, deleted from, modified, or otherwise changed during use to be more versatile, to support more or different applications and plug-ins, to accommodate new or different assets, etc. Thus, the class-based object platform structure described herein includes mechanisms to extend the objects within the model and to accommodate additional types of assets, for example. Moreover, it will be understood that the basic model definition of the class-based object platform structure (e.g., before being extended in individual asset environments) may be the same in some or all uses, and thus is consistent across different asset environments, plants, etc. This feature leads to consistent usages in different plants that may be, for example, owned, operated, or monitored by a common owner, operator, or monitoring entity, or even by different owners, operators, or monitoring entities.

More particularly, each asset class or asset class object has a set of properties that defines the physical and/or logical characteristics associated with an asset at some level of abstraction, and that are appropriate for its use by various technologies, applications, or processes. For example, asset class objects may include fields that define features of an asset, which may include properties, behaviors, etc. of the asset. As an example, physical properties may include things such as weight, size, lengths, flow capacity, etc. of an asset. Likewise, features may include descriptive properties such as a name, a description, a manufacturer, one or more images and/or icons to be used to represent an asset, etc. Still further, features may include behavioral properties and may, for example, include metadata that describe the behavior of an asset or an asset property, such as, if an asset field is read-only, a default value for a property of an asset, validation rules to be used with an asset, etc. Likewise, asset object features may include configuration properties or fields indicating how the asset can be configured or set up for a particular use.

Still further, each asset class or class object may have sub-classes associated therewith or defined therefrom that further refine the definition of an asset type. Each of the sub-classes of a class object inherits the properties of its parent class object, but sub-classes generally add or include additional features, e.g., properties (over that of the parent object) that further refine a definition of a particular asset sub-type. This operation of the asset object model is referred to as extending a class. Generally speaking, any of the asset classes in the object model may be extended. For example, some asset classes are defined by the core apparatus object, referred to as the asset platform or simply the platform. Such a platform may include an asset base class on which all asset sub-classes are built. Moreover, existing asset classes may be extended and new asset classes may be added to the model, and these added classes may then extended by the various applications or plug-ins 12, 14, 16 of FIG. 1. The applications that perform extension activities on the base asset object model are referred to as extenders, and these applications may extend both the asset class model and the platform apparatus.

As noted above, the properties of the base class are inherited by the sub-classes defined for or extended from the base class. However, the platform knows or tracks that each sub-class originated from a particular base class and knows or tracks the source of any properties and behaviors originating from or added by an extender. Still further, the class definitions as described herein include actual instances of an asset class object. Generally speaking, a class object instance is created from a class object, and thus has all the properties defined by the class object definition, including default values where applicable. However, a class object instance is used to represent a particular asset. Thus, class object instances generally have the feature fields (e.g., property fields) filled in based on a particular asset that is being represented by the class object instance.

Figure 3:
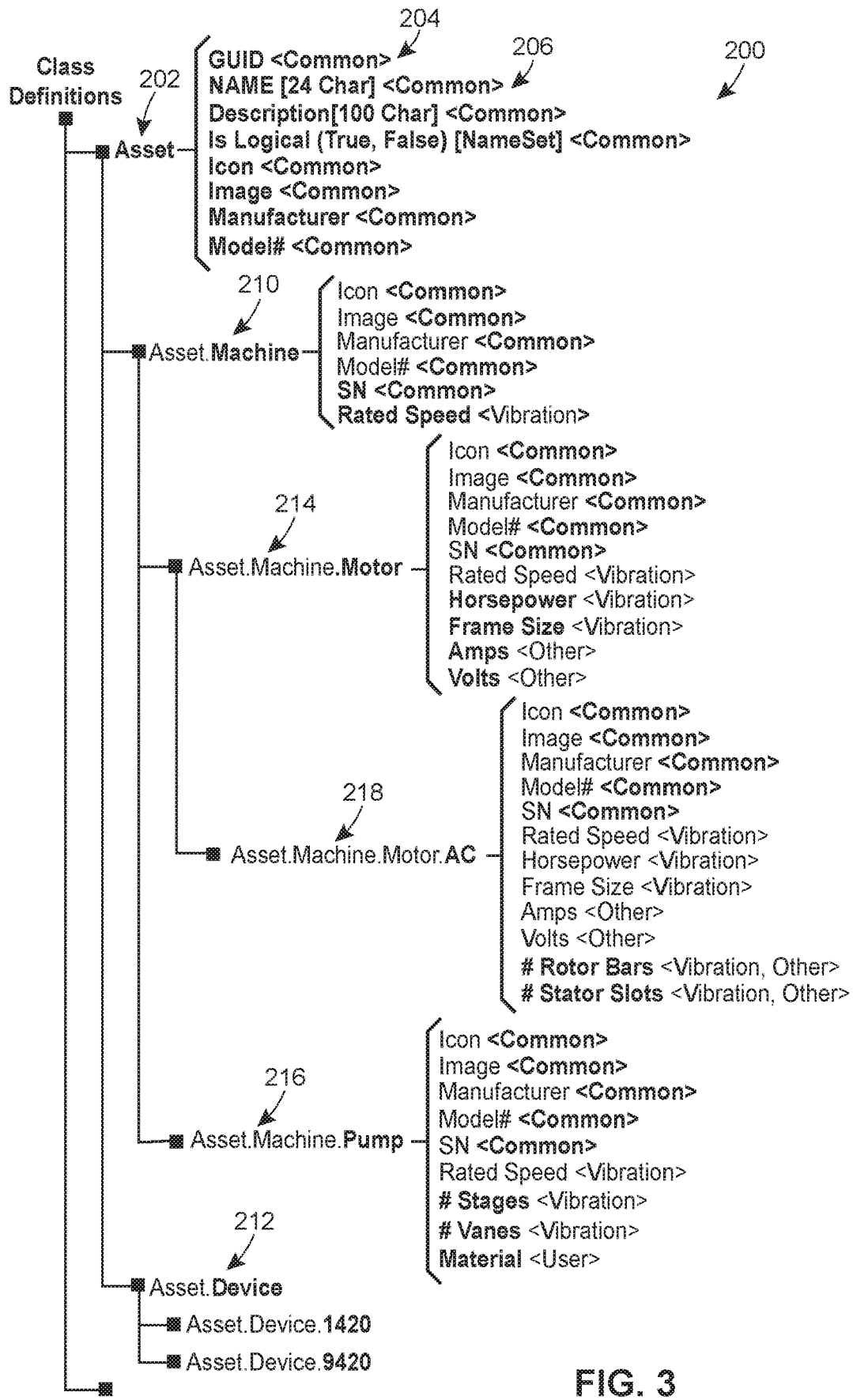
FIG. 3 is a hierarchical diagram of an example set of asset class objects and sub-class objects defined for a number of different asset types.

To better illustrate these concepts, FIG. 3 depicts an example asset class object hierarchy or model 200 that has been created to model various types of assets using the principles of the asset class object structure described herein. In particular, the asset class model 200 includes a base asset class object 202 with a set of features 204 and feature fields 206 associated therewith. In this case, the features 204 may define or name the properties, behaviors, and definitions common to all assets and the feature fields 206 may define the type of or characteristics of the data in each of the fields (length, type, etc.) Likewise, the feature fields 206 may define the application or source that created that feature within the object. In this case, the asset class object 202 has a set of features which will be included in all asset class objects, including a Name, a Description, an indication if it is a logical entity, an Icon, an Image, a Manufacturer, and a Model Number. Of course, other feature fields may exist as well or instead including, for example, feature fields defining a manner of communicating with an asset source that provides data about a particular asset that is tied to the object (i.e., an instance of the object). Such communication information may include a communication pathway, link, port, address, etc., a communication format or formats to be used to perform such communications, etc. In addition, the asset source may be the asset itself or a proxy for the asset, such as a database, a monitoring device that collects data about an asset, a process control, maintenance, or monitoring interface, etc. Likewise, the communication pathway or link may be a link or pathway that defines a communication link through one or more other devices and/or communication networks to an asset source for a particular asset. This communication information may be used during run-time of a communication system using the common platform 28 to enable the platform services 28 or an application or plug-in (12 or 14, for example) coupled to the common platform services 28 to obtain real-time or live data from one or more asset sources. The indication within the brackets < >within the feature fields 206 defines or identifies the source or creator of each of the fields, which in this case is the common platform 28. This indication may also indicate, within the model, the applications or plug-ins that will have access to or that will "see" this property when using the platform services 28. Other applications or plug-ins that are not listed in this property may be prohibited from seeing this property, if desired. On the other hand, once a property exists in the model, the platform services 28 may enable all applications to see or access that property.

As illustrated in FIG. 3, two asset sub-classes 210 and 212 have been defined from the Asset class, including a "Machine" asset class 210 and a "Device" asset class 212, indicated in FIG. 3 by the titles Asset.Machine and Asset.Device. Moreover, two further asset class objects (which are sub-class objects) have been defined for the Machine asset class object 210, including a Motor class object 214 and a Pump class object 216. Still further, an AC Motor class object 218 has been defined as a child or sub-class object beneath the Motor class object 214. As will be seen, each of the class objects 210, 214, 216, and 218 inherent all of the features and fields from their immediate parent class object and include additional features and feature fields associated therewith. Thus, for example, the AC Motor sub-class object inherits all the properties of the Motor class object 214 and further includes the properties of "# Rotor Bars" and "# Stator Slots" as part of this class object.

Still further, as can be seen in FIG. 3, various ones of the asset classes have been extended, and in some cases have been extended by different applications (or extenders). Thus, for example, the Motor class object 214 has a "Horsepower" property added by a plug-in (also in this context referred to as an extender) named Vibration, and the has an "Amps" property added by an extender named Other. Situations may arise where more than one plug-in extender requires the addition of the same semantic property, in which case that property is denoted as originating from multiple extenders. An example of this situation, the "# Rotor Bars" in the AC Motor class object 218 is illustrated as originating from both the MHM and the Other extenders.

As will be understood, the platform 28 may operate to have a service that enables plug-ins to retrieve all object properties (created by the platform and all extenders) or that enables plug-ins to retrieve only the object properties created by the platform (common) and itself. It will be understood that, while the model 200 of FIG. 3 illustrates definitions of and properties and other features for a number of asset class objects, various instances of these asset class objects can be created to represent actual physical entities in a plant or other asset environment. In this case, the feature fields of the object instances will be filled out with data or information specific to and possibly acquired from the actual assets to which the object instances are tied Referring now to FIG. 4, the platform 28 of FIG. 1 is illustrated in more detail to illustrate a manner in which the platform 28 may be configured to perform services using the class-based object hierarchies described herein. In particular, the platform services machine 28 includes the API 22 and 34 of FIG. 1, which are configured to execute on a processor 340 to interface with asset sources and various applications or plug-ins that use the common platform services to thereby enable plug-ins to access data from, receive messages from, send messages to, configure, etc. one or more assets within, for example, a plant environment, via the services bus 24 and the databus 26. The platform services machine 28 also includes an interior or internal network bus 350 or link coupled to the APIs 22 and 34 as well as to the buses 24 and 26 via one or more ports 351. The internal bus 350 is used by various platform services or service modules 352 that are configured or created to execute on the processor 340 (which may be a micro-processor, a general purpose processor running an operating system, an application specific integrated circuit ASIC, or any other desired type of electronic processor) to perform various different low level services or processes based on calls from the APIs 22 and 34.

The services 352 may include, for example, data reading services, data writing services, communications services, networking services, downloading services, execution services, messaging services or services which may be called through the API 22 by various different plug-in applications external to the platform services machine 28. In some cases, some of the services 352 may use or call other of the services 352. Generally speaking, some or all of the platform services 352 may access and use data within the object model (such as that of FIG. 3) to perform these services, including reading data from the object model pertaining to various assets or other physical or logical entities defined in the object model, using relationships 366 (discussed below) defined between the objects in the object model to perform actions, such as forwarding messages, forwarding or collecting data, using data within the object model to communicate with asset sources, modifying or extending the object model or data within the object model, etc.

Figure 4:
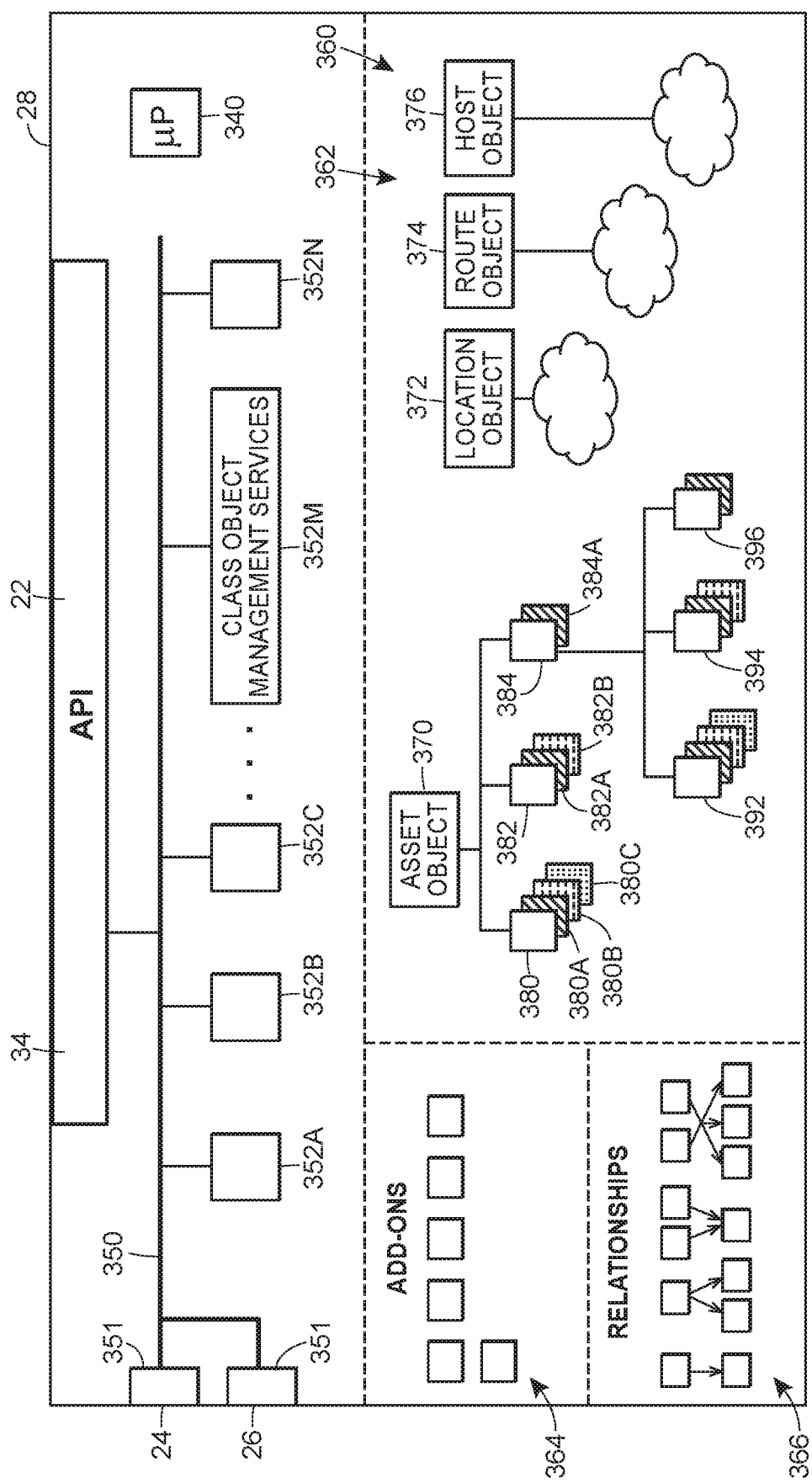
FIG. 4 is a schematic diagram of a platform apparatus or structure that stores a set of asset class objects, add-on objects, and relationship definitions to define properties of and relationships between various assets, and that uses these objects to perform platform services.

Importantly, one of the services 352, labeled in FIG. 4 as services 352M, is a class object management service, which is used to generate, configure, and manage the various class models or class-based hierarchies as described herein to thereby enable the objects of the class models to be used or accessed by others of the services 352 to perform data reading, writing, messaging, etc. functions, as called for by various plug-in applications. In particular, the services 352M may enable the class object hierarchies of the platform machine 28 to be created, extended, modified, populated with data, etc. Another service 352N may use the stored hierarchy and the data therein to determine which applications or plug-ins have access to which class objects, class object instances, object properties or other object features, etc.

As indicated above, the class-based object hierarchy may include class objects for any of various types of phenomena or information, including for assets, locations, routes, hosts, etc. Thus, the class services 352A may be used to create class objects, such as asset class objects, location class objects, host class objects, etc., and to extend and modify those class objects in response to API calls from various applications or plug-ins connected to the platform services 28 via the API 22. Once created, various other ones of the platform services 352 may use the asset or other objects created and managed by the platform services 352M to perform actions, such as obtaining data from various different devices or assets, forwarding messages, writing information to various assets, performing analysis on data, modifying asset or information within assets in the plant, sending data or information to various users or various plug-in applications, etc.

As illustrated in FIG. 4, the platform services machine 28 includes a memory 360 which may store one or more object models including various types of class objects 362 (which represent physical entities or logical information within a plant), may store various add-on objects 364 (which represent additional information used by or associated with multiple different ones of the objects 362), and may store relationship definitions referred to herein as relationships 366 (which define relationships between various ones of the objects 362). More particularly, as illustrated in FIG. 4, the object model includes various types of class objects 362 that may include a set of asset class objects 370, a set of location class objects 372, a set of route class objects 374, and a set of host class objects 376, as well as any other types of class objects representing other physical or logical structures or phenomena within or associated with a plant or combination of plants. As will be understood, asset objects 370 define or relate to physical assets within the plant, such as machines, devices, monitors, etc. Location objects 372 may define or be associated with various locations in a plant, such as plant sites, floors, rooms, sections, areas, etc. Route objects 374 may define or represent routes within the plant, including physical routes, communication routes, etc. Likewise, host objects 376 may define or relate to hosts or host machines (computers) within a plant, including, for example, maintenance hosts, control operator hosts, monitoring hosts, etc. As will be evident, the asset objects 370 (or the asset object model) will described in greater detail herein. However, it will be understood that other types of class-based objects and object models, such as the host, the route, and the location object models, may be created and configured using the same principles described herein for the asset class-based objects or asset model. Still further, the use of such objects and object hierarchy structures described herein may be applied to and used for other types of physical or logical phenomena besides those specifically described or mentioned herein.

Each of the sets of the various types of class-based objects, such as the asset objects 370, includes a common or base class object and may include multiple child class objects, grandchild class objects, etc. which define sub-objects (class objects) that are more detailed in nature. As explained herein, each such class object includes or defines various properties, definitions, and behaviors that are associated with the physical or logical phenomena or entity represented by the class objects. Each class object can have any number of sub-objects (which are also class objects and are also referred to herein as child class objects or child objects) depending therefrom. Each such sub-object includes or inherits all of the properties, definitions, and behaviors of the parent object. However sub-objects (class objects) include additional properties, definitions, and/or behaviors that further define a species of the more generic parent class object. For example, FIG. 4 illustrates a set of sub-objects associated with or depending from the base asset class object 370 including a machine class object 380, an analysis class object 382, and a monitor class object 384. Of course, other types of assets could have other asset class objects defined therefore, and may depend from the base asset class object 370. Generally speaking, the base asset class object 370 defines a set of properties, definitions and behaviors (collectively called features) associated with all assets and the sub-class objects 380, 382, 384 inherit these base features and include additional features specific to the particular type of asset associated with the sub-class object, making these sub-class objects more specific to a particular type of asset.

As illustrated in FIG. 4, each of the asset class objects 380, 382 and 384 may include asset object instances thereof. Each instance of a class object includes all of the features of the class object, but is associated with or tied to an actual or particular physical or logical entity within the plant. In particular, the instances of an asset class object are tied to and represent a particular asset within a plant of the type defined by the asset class object from which the instance was created. However, the class object instance includes particular data or information for each of the defined features (properties, definitions, behaviors) that are associated with a particular entity in the plant. Thus, for example, the illustration of the platform services machine 28 in FIG. 4 includes three instances 380A through 380C of the machine asset class object 380, which may represent particular machines in the plant, includes two instances 382A, 382B for the analysis asset class object 382, which may reflect vibration analysis devices in the plant, and one instance 384A of the monitor asset class object 384, which may represent a particular monitoring device or node in the plant. Each of the asset class object instances will have data obtained from or associated with the various particular entities being represented in the plant, within the feature fields defined by the class object from which the instance was created.

Of course, any class object or sub-object defined therefor may have instances thereof. This structure may be repeated any number of times within the hierarchy to define any number of levels of the asset class object hierarchy to thereby define any number of levels of abstraction for assets within the plant. Thus, as illustrated in FIG. 4, various sub-class objects 392, 394, and 396 are defined for the class object 384 and various instances are created and stored for each of these sub-class objects 390, 394, 396. This structure of class based objects may continue down the object hierarchy as far as necessary (parent to child to grandchild, etc.) as needed to further define or refine various assets or types of assets within a plant.

While not explicitly illustrated in FIG. 4, similar types of class-based object structures may be defined for locations 372, routes 374, and hosts 376 as well as any other physical or logical phenomena for which class objects are used by the platform services. This fact is illustrated by the cloud indication below the base class objects 372, 374, and 376.

As noted above, the class-based object structure illustrated in FIG. 4 and as described herein provides for the inheritance of properties from a parent to a child and each class-based object instance includes data within each of the particular feature fields defined for the class object from which the instance was created. As will be understood, the services 352M may operate to enforce these inheritance properties when creating or defining new class objects and instances within the class hierarchy. Still further, instances of the particular asset class-based objects are connected to (associated with) a single or particular asset within the plant, for example, and include information specific to the that asset to define that asset, so as to enable communication with and proper organization of that asset within the hierarchy in order to enable coherent and comprehensive understanding of the asset through the platform services machine 28, including what the asset is, how it is defined, properties and behaviors of the asset, and how to communicate with the asset.

One of the limitations of the simple inheritance model between classes and sub-classes as described above, is that un-related classes cannot share the same set of properties and that, in some cases, it is not desirable to have some properties or features of objects be inheritable to child objects. This limitation can be solved by the use of add-on objects within the class based model or hierarchy.

As illustrated in FIG. 4, the platform services database 360 may store a set of add-on objects 364. The add-on objects 364 are similar to class-based objects except that the add-on objects 364 do not provide for inherence properties between parent and children objects. Instead, the add-on objects 364 are designed to be connected to or to be associated various ones of the asset objects 370 or other class-based objects in order to provide further definitions or properties for those objects. Typically, add-on objects are objects that define or include properties or other features that may be applicable to assets across a wide variety of asset classes but without necessarily following down a particular parent/child chain of the asset class objects. Thus, an add-on object may be applicable to a child asset class object or even to an instance of a child asset class object, without being relevant to or applicable to the parent class object or parent class object instance. Thus, add-on objects 364 are used to provide an ability to associate new properties with various different class objects or instances of class objects at different levels of the class-based object hierarchy without these properties being inherited or inheritable from parent to child. In some cases, an add-on object 364 may have no properties other than an add-on name, which may be used to tag a class object or an instance of a class object for descriptive or categorization purposes.

More particularly, add-on objects 364 have a similar structure to asset class objects, in that, similar to asset class objects, add-on objects 364 may have properties. However, for simplicity, inheritance of properties is not supported for add-on objects 364. Thus, add-on objects 364 may be used to define behaviors and/or properties that apply to particular asset class instances but not necessarily to all class instances from a class object. In general, there may be multiple asset instances for any given asset class definition and the same or different ones of the add-on objects 364 may be applied to different ones of those instances without being applied to all of the instances. Moreover, any of the asset object instances, whether or not they have the same asset class definition, may have the same add-ons objects 364 assigned thereto or associated therewith. For example, multiple asset instances of a monitoring device, such as a pressure sensor, may be used for measuring different ones of pressure, fluid level, or flow rate. Each of the class object instances associated with these different pressure assets may have a different add-on instance assigned to them (i.e., a pressure add-on object, a level add-on object, or a flow add-on object) to thereby characterize the operation of these devices in the plant.

The advantage of using add-ons objects 364 to describe the behavior of class instances is that the add-on objects 364 can be defined once and used on multiple asset class instances. While add-on objects 364 may include definitions that define or explain the operation or configuration of a device or asset in a plant, add-on objects 364 may have specific properties. For example, an Ethernet add-on object may have a property of an "IP Address" which may be filled in with a specific address, when an class object instance is created with that add-on object. Moreover, class object definitions may have a list of allowed add-on objects and a list of required add-on objects, if desired, as part of the properties thereof. If desired, when the class object definition does not include a particular add-on as an allowed add-on, then any class object instance derived from the class definition cannot have the add-on object added thereto. Again, the class definitions services 352M may enforce these rules when setting up or extending the asset class hierarchy or model.

As illustrated in FIG. 4, the platform services database 360 includes a set of relationships 366 which may be defined or stored therein. The relationships 366 may be used to define various types of relationships between various different ones of the asset objects including asset class objects and instances of asset class objects. Typically, the relationship definitions 366 define asset pairs (or asset object pairs) and a type of relationship. The asset object pairs may be a one to one, one to many, many to one, or many to many pair.

Generally speaking, relationships 366 extend the class based model or hierarchy beyond the basic parent/child relationships to define additional relationships between the classes or objects in the classes including instances of class objects. Types of relationships might include, for example, a "controlled-by" relationship (indicating that one asset is controlled by another asset), an "is-controlling" relationship (indicating that one asset controls another asset), a "monitored-by" relationship (indicating that one asset is monitored by another asset), an "is-monitoring" relationship (indicating that one asset monitors another asset), a "parent-child" relationship (defining object inheritance relationships), a "roll-up" relationship, a "bound-to" relationship, a "relay" relationship, or any of various other types of relationships.

The relationships 366 are designed for extensibility in that relationships 366 can be defined, created, modified, deleted, and changed during operation of the plant or asset system and may be connected to or disconnected from the asset objects in the asset hierarchy at any time by the class object management services 352M. Thus, while not all relationships in the real-world may be included in a hierarchy, the services 352M may operate to extend the class-based model and apparatus to accommodate additional types of relationships and to allow relationships to be established between different types of class object structures, such as between location and asset objects, between route and asset objects, between route and location objects, etc.

An example of the types of relationships that may be defined and stored in the database 360 is a parent-child relationship. As indicated above, the asset parent-child relationships have inherit property behavior whereby the child inherits the properties of its parent and can have additional properties of its own. Relationships defined for other types of class objects need not necessarily require the property inheritance behavior of the asset class object parent-child relationship. For example, the location class objects may not implement the property inheritance behavior.

Another example relationship includes the monitored-by relationship, which may be used to relate an asset such as a machine to an asset that is a monitoring device such as a vibration monitor. For example a motor being monitored by a CSI 9420 vibration monitoring device may have a monitored-by relationship defined therefor with respect to the CSI 9420 device. An is-monitoring relationship is basically the converse of the monitored-by relationship and may be used to relate an asset such as a monitoring device to an asset that it is a monitoring. For example, when a CSI 9420 vibration monitoring device is monitoring a motor.

Another example relationship is the controlled-by relationship, which may be used to relate an asset such as a machine to an asset that is being controlled by a controller. For example, a motor being controlled by a motor controller. An is-controlling relationship is the converse of the controlled-by relationship and may be used to relate an asset such as a controller to an asset that it is a controlling. For example a motor controller that is controlling a motor.

Another example of a relationship is the roll-up relationship. This relationship may be used to indicate how or if information or data is to be rolled-up from a child class instance to its parent class instance. An example of roll-up instance may be a roll-up of asset health from a child asset object instance to its parent asset object instance. In this case, the roll-up relationship enables or may be used to perform a calculation at or associated with the parent object instance, such as combining the health values from multiple child asset instances into a single parent asset health parameter value. Of course, the roll-up relationship may be used in other instances or for other purposes.

Still another example of a relationship type is the relay relationship, which indicates that an asset instance or asset object instance relays or passes on designated/specified properties/information from one class instance to another. An example of the use of such a relationship is in the situation in which there is a transfer of a message from a child asset instance to its parent asset instance or from an asset object instance to its location object instance.

Moreover, another relationship is a bound-to relationship which enables a class object or object instance to be bound to another instance after its creation. In particular, one of the issues encountered during the creation of a class hierarchy is that the person creating the hierarchy may not have direct access to certain assets, such as monitoring devices (e.g., a CSI 9420 device) when creating the hierarchy or object model. In these situations, the user may create a "placeholder" class instance representing the actual asset. These placeholder instances are from a particular class object, but are not yet tied to an actual physical device. The action of binding is a relationship whereby the placeholder class instance becomes bound to and fully connected to the actual physical asset. A consequence of the binding is that certain property values of the placeholder instance are replaced by the actual property values of the physical asset. For example, the placeholder would not have a serial number property value whereas once the place-holder is bound to the physical asset, there would most likely be an actual serial number of the asset within the placeholder object instance.

Moreover, relationships between class definitions are configurable at run-time between class instances. For example, the "bound-to" relationship between a location and an asset would expose/allow the binding behavior between a location instance and an asset instance during runtime.

Still further, class relationships may have specific behavior when class instances are moved (new parent/child relationship), are duplicated (copy/paste), and/or deleted within the class model or hierarchy. The class object management services 352M may enforce these rules or actions upon a move, duplicate, or delete operation by an authorized application or plug-in. For example, when an object instance is moved, there are two relationships that change. The parent/child relationship of the moved class instance is changed and the roll-up relationship is removed. All other relationships may be maintained even if they are outside of the class instance that was moved. Likewise, for a copy/paste (duplicate) action, if a class instance is copied and pasted (duplicated) a new parent/child relationship is created and all other relationships may be removed. Still further, upon a delete object action, all relationships are removed. Still further, the bind relationship may cause some properties to overwrite from one class instance to another.

Figure 5:
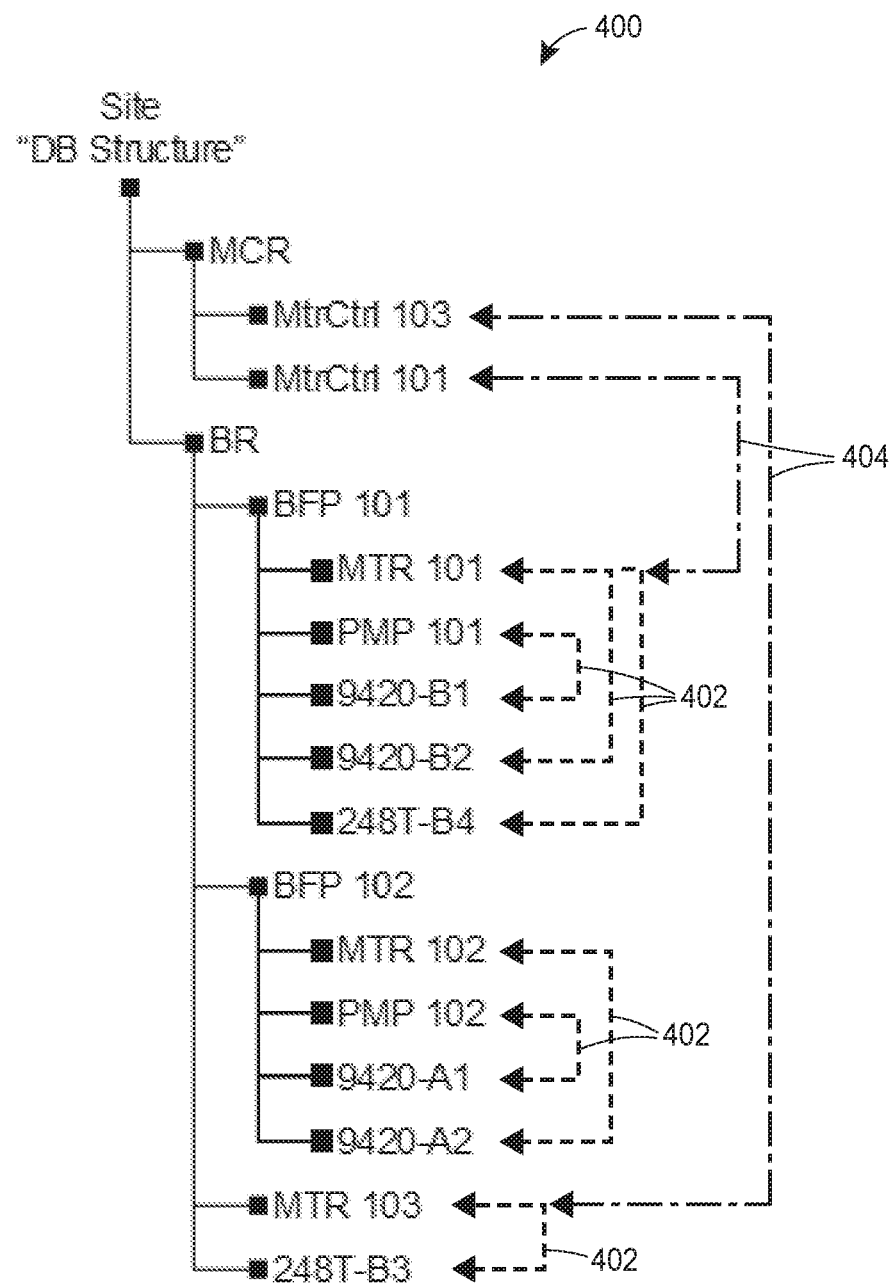
FIG. 5 is a diagram of a plant hierarchy that defines various class-objects including asset objects and defined interrelationships between some of the asset objects.

To illustrate various relationships, FIG. 5 depicts a plant hierarchy 400 including a base node labeled Site DB (database) Structure, which includes two locations associated therewith, including a motor control room MCR and a boiler room BR. The hierarchy 400 includes two motor controllers MtrCtrl 103 and MtrCtrl 101 while the boiler room includes two boiler feed pumps BFP 101 and BFP 102, a motor MTR 103, and a monitoring device 248T-B3. The boiler feed pump 101 includes a motor MTR 101, a pump PMP 101, two monitoring devices 9420-B1 and 9420-B2 and a monitoring device 248T-B4. Likewise, the boiler feed pump 102 includes a motor MTR 102, a pump PMP 102, and two monitoring devices 9420-A1 and 9420-A2.

The dotted lines 402 in FIG. 5 illustrate monitored-by relationships that exist between various ones of the devices, it being understood that these relationships would be defined as being between the object instances associated with these devices in the model or class hierarchy. In particular, the monitoring device 9420-B1 monitors the pump PMP 101, while both the monitoring devices 9420-B2 and 248T-B4 monitor the motor MTR 101. Similarly, the monitoring device 9420-A1 monitors the pump PMP 102, while the monitoring device 9420-A2 monitors the motor MTR 102. Finally, the monitoring device 248T-B3 monitors the motor MTR 103.

Still further, as illustrated in FIG. 5 by the dashed/dotted lines 404, a controlled-by relationship exists or has been defined between the motor MTR 103 and the motor controller MtrCtrl 103 and between the motor MTR 101 and the motor controller MtrCtrl 101. A depiction of the hierarchy such as that of FIG. 5 (or FIG. 3) may be provide by one or more plug-ins using data obtained from the object model of the platform machine 28 as one example of how the object model may be used to provide data to various plug-ins.

Figure 6:
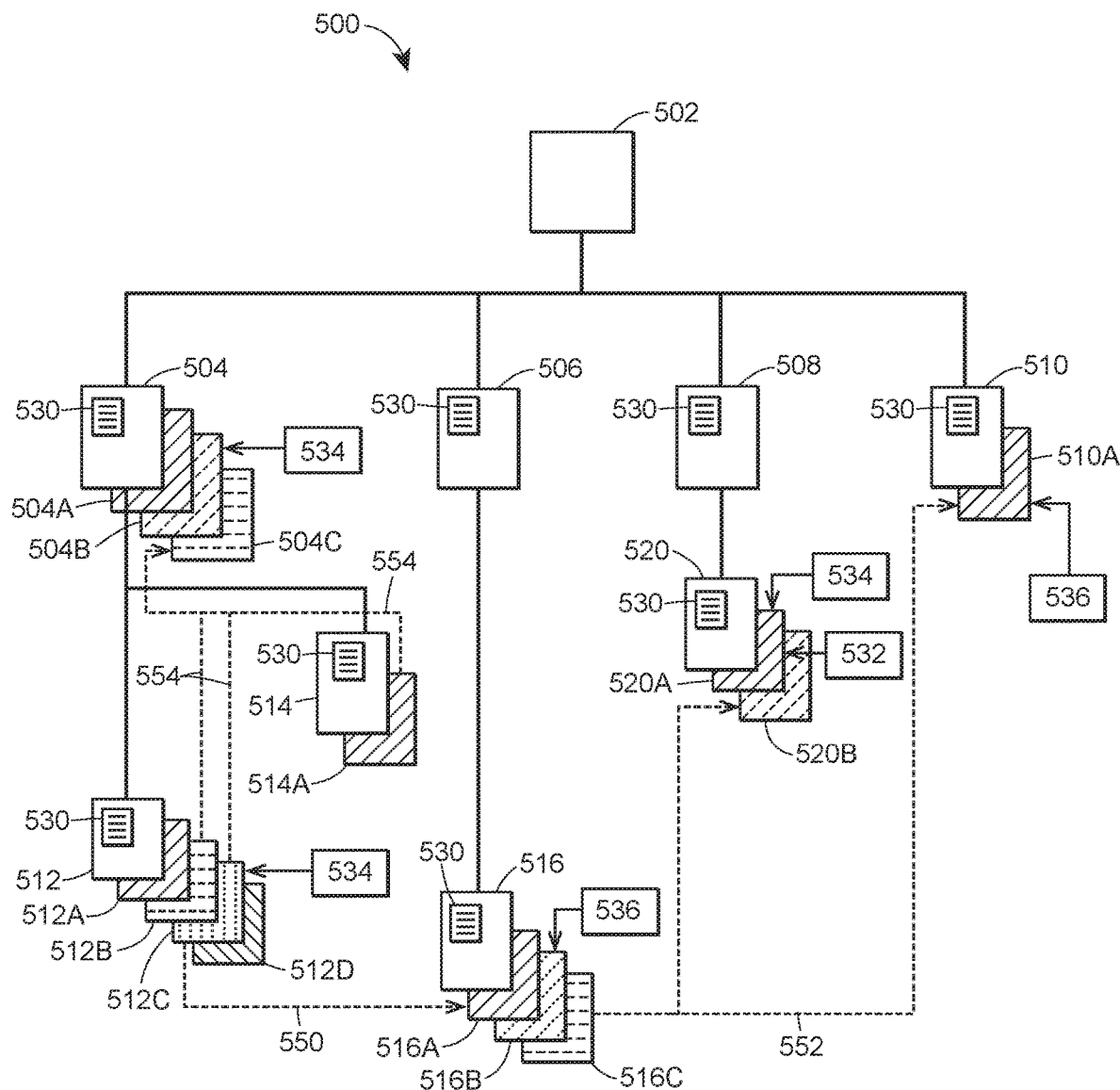
FIG. 6 is a more detailed diagram of an example set of asset class objects, sub-class objects, object instances, and add-ons, and that further illustrates various relationships defined between some of the asset objects.

As another example, FIG. 6 provides a schematic diagram of a class-based object hierarchy structure 500 that may be defined for a plant, for example, and illustrates various different add-on objects as they might be connected to various different asset objects including asset class objects and asset instance objects, as well as relationships between a number of different asset object instances. In particular, FIG. 6 illustrates an asset class object structure 500 having a base asset class object 502 from which four asset class sub-objects 504, 506, 508, and 510 have been defined. As illustrated in FIG. 6, various asset class object instances 504A through 504C exist or have been created for the asset class object 504, no asset class object instances have been created for the class objects 506 and 508, and one asset class object instance 510A has been created for the class object 510. However, the asset class object 504 has two further asset class sub-objects 512 and 514, and the asset class sub-object 512 includes four instance asset class objects 512A through 512D while the asset sub-class object 514 includes one object instance 514A. Still further, the class asset sub-object 506, includes a single class sub-object 516 created therefrom, which has four asset class sub-object instances 516A through 516D. In a similar manner, the asset class object 508 includes a single asset class sub-object 520 with two object instances 520A and 520B. Likewise, the asset class sub-object 510 includes no class sub-objects, but includes a single instance object 510A.

As best illustrated in FIG. 6, various add-on objects have been defined and are associated with or connected to various different ones of the asset class objects (or sub-objects) and asset class object instances of the object model 500. As a general matter, each of the asset class objects 504, 506, 508, 510, 512, 514, 516, and 520 includes a list of permissible and/or required add-on objects 530. As such, class object instances from these class objects could have zero, one or more of the permissible add-on objects within the list 530 of the associated asset class object, and must include the add-on objects indicated as required in the lists 530. The lists 530 may be inheritable through the parent-child relationship and could, similar to other properties, be increased or added to at the child level of a parent-child pair. Inheritance of the list 530 is not necessary, however.

By way of example, two add-on objects 532 and 534 are illustrated as being associated with or tied to the asset class object instance 520A to further define that object instance. Here, the add-on objects 532 and 534 would be provided in the permissible or required list of add-ons 530 associated with the asset class object 520. Additionally, the add-on object 534 is associated with the asset object instances 504B and 512C, which are in a parent-child relationship (because their respective asset class objects are in a parent-child relationship.) However, the add-on object 536 is connected to and associated with each of asset object instances 510A and 516B which are not in a parent-child relationship. As will be understood, any number of the add-on objects could be associated with any of the asset class objects or instances of the asset class objects and the same add-on object can be associated with different asset class objects and/or asset class object instances including ones that are and that are not in a direct or indirect parent-child relationship.

Still further FIG. 6 illustrates various relationships as defined between the asset objects in the model 500 using dotted lines between various asset class objects and/or asset class object instances. For example, a dotted line 550 illustrates a one to one is-monitoring relationship between two of the class object instances 512C and 516A, indicating that the asset associated with the asset object instance 512C is monitoring the asset associated with the class object instance 516A Likewise the dotted line 552 illustrates a one to many controlled-by relationship in which the assets associated with the class object instances 520B and 510A are being controlled by the asset associated with the class object instance 516C. The set of dotted lines 554 illustrates a roll-up relationship in which information from the class object instance 512B, 512C and 514A are rolled up (provided) to a parent class object instance 504C, which may perform some action on these rolled-up values but not on such values from the assets associated with the object instances 512A and 512D. Of course, other types and numbers of add-on objects and other types and numbers of relationships could be defined for and illustrated within the various asset class objects and asset class object instances, instead of or in addition to those illustrated in FIG. 6. Thus, it will be understood that FIG. 6 merely depicts but a single example of various different types of asset class structures, add-on structures, class object instance structures, and relationships which may be created and used in the platform model.

Thus, as described herein, the platform 28 includes a set of extensible asset classes (EAC) which includes an extensible model and apparatus that describes various types of assets and classifies these assets into a logical structure that models real-world assets. Each such asset class uniquely defines its properties and behaviors. Moreover, both the EAC model and apparatus are extensible. As described herein, the asset classes may have sub-classes that further refine the definition of the asset being modeled, such that parent classes are generalizations of the more specific child or sub-classes. Additionally, asset classes may have sub-classes that inherit the properties and behaviors of their parent and may have additional unique properties and behaviors of their own. Moreover, each asset class has a set of properties that defines its physical or logical characteristics that are appropriate for its use by various technologies, applications and processes, and that can be accessed by the technologies, applications and processes to obtain asset information for use in performing data acquisition and analysis, messaging, etc. Still further, extender apparatuses or applications may extend existing asset classes by adding properties and behaviors to them, and in some cases, extender apparatuses may add entirely new asset classes and sub-classes. During use, the class definitions are used to create actual instances of an asset of that class and the asset class instance has all the properties defined by its class definition, including default values where applicable.

Still further, add-ons objects, which may have their own set of properties and behaviors, are used to define behaviors and/or properties that apply to some of the asset class instances and are typically applicable to instances from various different asset classes. Add-on objects can be advantageously used instead of class inheritance when the properties and behaviors are common across a diverse set of classes that may not have common parentage in the class hierarchy and/or when particular class instances may or may not embody the properties and behaviors being modeled. Moreover, the class object definitions can have a list of allowed add-on objects and a list of required add-on objects. If a class definition list does not include an add-on object as an allowed add-on, then any class instance derived from the class definition cannot embody the add-on.

Class relationships are definitions of relationships between objects in the model and may apply to many different types of classes or class objects, such as assets, locations, routes, and hosts, just to mention a few. While relationships of the types "monitored-by", "is-monitoring", "controlled-by, "is-controlling", "bound-to", "roll-up", and "relay" are described herein, these are just a few of the possible examples of relationships and other types of class relationships may be used that possess similar behavior. Still further, the classes or class objects define the allowable relationships that are associated with those objects and related sub-objects and instances, while an instance of each allowable relationship is defined for each actual class instance. Moreover, relationships between class definitions are configurable at run-time between class instances.

In these examples, asset parent-child relationships have the inherit property behavior whereby the child inherits the properties from its parent and can have additional properties of its own. However, non-asset object or class parent-child relationships need not necessarily have the property inheritance behavior.

The monitored-by relationship is used to relate an asset such as a machine to an asset that is a monitoring device such as a vibration monitor, while the is-monitoring relationship is used to relate an asset such as a monitoring device to an asset that it is monitoring. Likewise, the controlled-by relationship is used to relate an asset, such as a machine, to an asset that is being controlled by a controller and the is-controlling relationship is used to relate an asset such as a controller to an asset that it is controlling.

The roll-up relationship is used to indicate a roll-up or passing of information from a child class instance to its parent class instance, the relay relationship relays or passes on designated/specified properties/information from one class instance to another, and the bound-to relationship is a relationship whereby a placeholder class object instance is fully connected to the actual physical asset. A consequence of the binding is that certain property values of the placeholder object instance are replaced by the actual property values of the physical asset.

Class relationships have specific behavior when class instances are moved (new parent/child relationship), duplicated, and deleted. For example, moving a class instance results in two relationships changing. The parent-child relationship of the moved class instance is changed and the roll-up relationship is removed. All other relationships are maintained even if they are outside of the class instance that was moved. The copy/paste (duplicate) action on a class instance results in a new parent-child relationship being created and all other relationships being removed. Likewise, deleting a class instance results in all relationships being removed. The bind action may cause some properties to overwrite from one class instance to another.

As will be understood, the software platform described herein stores and provides access to the model and the data within the model, including asset data associated with each of the model objects (including class objects and object instances) to enable applications or plug-ins to view, understand, parse, search, and otherwise use the data, as well as to obtain collected data from the assets themselves. This system essentially provides a front end interface for accessing information and data from and about various assets, such as plant assets, to enable different applications (which may be developed by different vendors) to obtain and use asset data in a particular plant or other asset environment in a coordinated and seamless manner. This configuration may also limit or reduce overall communications in the system as the plug-in applications do not need to, in many instances, poll the assets for information already stored in the platform model, such as asset definition information, asset property information, asset behavior information, relationships, etc. The software platform additionally enables various applications to add to or extend the model to provide for the addition of new assets, or new types of information about or available from assets within the asset environment.

Still further, as mentioned above, the basic model definition of the class-based object platform structure (e.g., before being extended in individual asset environments) may be the same in some or all uses, and thus may be consistent across different asset environments, plants, etc. This feature leads to consistent usages in different plants that may be, for example, owned, operated, or monitored by a common owner, operator, or monitoring entity, or even by different owners, operators, or monitoring entities. For example, the class object model, which may be a basic non-extended model or which may include the add-ons, relationships, etc., defined by particular users, may be unified (i.e., may be the same) across multiple installations. Thus, while the particular instances of class objects may be unique within every installation or within different installations, the model may still be the same as the model may have the same hierarchical structure and naming conventions. For example, a Motor class at a first customer site can be the same Motor class that is present in the model used at a second customer site. Thus, the same model structure (including the hierarchy and class object naming conventions) can be the same, at least at in a pre-extended state, across multiple different asset environments. However, because the model is extensible, variations in the basic (or pre-extended) model may be seen at different sites, based on which extenders are in place at each site. None-the-less, in the case in which a first asset environment has the exact same extenders in place as a second asset environment, the models at these sites with be practically identical.

The model data and actual asset and other data may be accessed by computers directly or indirectly interfaced with the platform infrastructure. The platform infrastructure may be interfaced with other networks, including the Internet. Thus, data or information may be received and displayed on mobile devices such as an iPhone or an Android device or on other workstations or computer devices. The data may be displayed and manipulated in any manner, including via images, videos, voice and other sound recordings, to allow use and manipulation of this data by the receiving application or device. Of course, the data may be used and viewed in any other desired manner.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electronic communication system, for use in an asset environment having a plurality of physical assets of different types and uses, the electronic communication system comprising:
   a processor;
   a memory;
   a communication interface;
   an object model stored in the memory, the object model including one or more class objects, each of the one or more class objects being indicative of a physical or logical entity within the asset environment having the plurality of physical assets of different types and uses, each of the class objects including one or more features defining one or more aspects of a physical or logical entity within the asset environment, and feature fields indicating data to be stored for each of the features; and
   a multiplicity of platform services coupled to the communication interface that execute on the processor to receive and process messages from one or more applications, wherein one or more of the multiplicity of platform services uses the object model to perform actions with respect to the messages from the one or more applications;
   wherein at least one of the platform services operates as an extender application to manage the object model during use by enabling the object model to be extended to include additional object information defining additional information about physical or logical entities in the asset environment,
   wherein the asset environment defines an asset environment of a process plant, and wherein the extender application modifies the object model to classify at least one physical or logical entity as a logical structure that models a real-world asset of the process plant.

2. The electronic communication system of claim 1, wherein the object model stores a plurality of asset class objects, each asset class object representing a type of a physical asset within the asset environment.

3. The electronic communication system of claim 1, wherein the object model stores a plurality of location class objects, each location class object representing a type of a location within the asset environment.

4. The electronic communication system of claim 1, wherein the object model stores a plurality of host class objects, each host class object representing a type of a host machine associated with the asset environment.

5. The electronic communication system of claim 1, wherein the object model stores a plurality of route class objects, each route class object representing a type of a route within the asset environment.

6. The electronic communication system of claim 1, wherein the object model stores a plurality of asset class objects, each asset class object representing a type of a physical asset within the asset environment and wherein the object model stores one or more asset object instances for one of the asset class objects, wherein each of the asset object instances includes the features of the one of the asset class objects and includes data defining a particular asset within the asset environment within the feature fields of the asset object instance.

7. The electronic communication system of claim 6, wherein one of the plurality of asset class objects is a sub-class object of another one of the plurality of asset class objects and wherein the sub-class object includes all of the features of the another one of the plurality of asset class objects.

8. The electronic communication system of claim 7, wherein the at least one of the platform services manages the object model by enabling the object model to be extended to include one or more additional asset class objects defining additional information about a type of asset in the asset environment.

9. The electronic communication system of claim 7, wherein the at least one of the platform services manages the object model by enabling the object model to be extended to include additional features of an asset class object.

10. The electronic communication system of claim 9, wherein the at least one of the platform services manages the object model by storing an indication of an application that extended the object model to include an additional feature in one of the asset class objects.

11. The electronic communication system of claim 10, wherein the at least one of the platform services manages the object model by storing an indication of multiple applications associated with an additional feature of an asset class object that has been extended in the object model.

12. The electronic communication system of claim 10, wherein one of the platform services limits access to the additional feature of the extended asset class object or any asset class object instances created therefrom, to one or more applications stored in the asset class object or asset class object instances created therefrom as being associated with the additional feature.

13. The electronic communication system of claim 1, wherein the object model includes one or more add-on objects, wherein each of the one or more add-on objects includes a set of features defining asset information, and wherein one or more of the add-on objects is associated with one or more of the asset class objects or instances of the one or more asset class objects to further define the asset associated with the one or more asset class objects or instances of the one or more asset class objects.

14. The electronic communication system of claim 13, wherein at least one of the asset class objects includes a list of add-on objects defining the add-on objects that may be associated with asset class object instances of the at least one of the asset class objects.

15. The electronic communication system of claim 14, wherein the one of the platform services that manages the object model prevents the association of an add-on object with an asset class object instance of an asset class object when the add-on object is not within the list of add-on objects of the asset class object.

16. The electronic communication system of claim 13, wherein at least one of the asset class objects includes a list of add-on objects defining the add-on objects that must be associated with asset class object instances of the at least one of the asset class objects.

17. The electronic communication system of claim 1, wherein the object model includes one or more relationship definitions, wherein each relationship definition defines a relationship between two or more class objects.

18. The electronic communication system of claim 17, wherein the one or more relationship definitions defines a controlled-by relationship in which an asset associated with a first asset object instance is controlled by an asset associated with a second asset object instance.

19. The electronic communication system of claim 17, wherein the one or more relationship definitions defines an is-controlling relationship in which an asset associated with a first asset object instance is controlling an asset associated with a second asset object instance.

20. The electronic communication system of claim 17, wherein the one or more relationship definitions defines a monitored-by relationship in which an asset associated with a first asset object instance is monitored by an asset associated with a second asset object instance.

21. The electronic communication system of claim 17, wherein the one or more relationship definitions defines an is-monitoring relationship in which an asset associated with a first asset object instance is monitoring an asset associated with a second asset object instance.

22. The electronic communication system of claim 17, wherein the one or more relationship definitions defines a roll-up relationship in which data from one or more child asset object instances is to be used by or associated with the parent asset object instance for a particular purpose.

23. The electronic communication system of claim 17, wherein the one or more relationship definitions defines a relay relationship in which a first asset object instance provides information to a second asset object instance.

24. The electronic communication system of claim 23, wherein the information to be provided from the first asset object instance to the second asset object instance is an alert.

25. The electronic communication system of claim 17, wherein the one or more relationship definitions defines a bound-to relationship in which a first asset object instance is created as a placeholder asset object instance and is enabled, at a later time, to be bound to a particular asset within the asset environment by obtaining data for the features of the placeholder asset object instance from a data source of the particular asset within the asset environment.

26. The electronic communication system of claim 1, further including a first asset environment and a second asset environment, wherein the processor, the memory, the object model, and the multiplicity of platform services are located at the first asset environment, and wherein the second asset environment includes a second processor; a second memory; a second communication interface; a second object model stored in the second memory, the second object model including one or more class objects, each of the one or more class objects being indicative of a physical or logical entity within the second asset environment, each of the class objects including one or more features defining one or more aspects of a physical or logical entity within the second asset environment, and feature fields indicating data to be stored for each of the features; and a second multiplicity of platform services coupled to the second communication interface that execute on the second processor to receive and process messages from one or more applications, wherein one or more of the second multiplicity of platform services uses the second object model to perform actions with respect to the messages from the one or more applications, and wherein at least one of the second platform services manages the second object model by enabling the second object model to be extended to include additional object information defining additional information about physical or logical entities in the second asset environment, and wherein the object model is the same as the second object model.

27. The electronic communication system of claim 26, wherein the object model and the second object model are identical in a pre-extended state.

28. The electronic communication system of claim 26, wherein the object model and the second object model include the same class object hierarchy and naming convention in a pre-extended state.

29. A method of performing communications in an electronic communication system supporting an asset environment having a plurality of physical assets of different types and uses, the communication method comprising:
storing an object model in an electronic memory, the object model including one or more class objects, each of the one or more class objects being indicative of a physical or logical entity within the asset environment having the plurality of physical assets of different types and uses, each of the class objects including one or more features defining one or more features of a physical or logical entity within the asset environment, and feature fields for data to be stored for each of the features;
executing, via a processor, a communication interface to communicate with one or more external applications;
executing, via a processor, a multiplicity of platform services to receive and process messages from the one or more external applications, further including causing one or more of the multiplicity of platform services to use the object model to perform actions with respect to messages from the one or more external applications; and
executing, via a processor, at least one of the platform services to operate as an extender application to manage the object model during use by enabling the object model to be extended to include additional object information defining additional information about physical or logical entities in the asset environment,
wherein the asset environment defines an asset environment of a process plant, and wherein the extender application modifies the object model to classify at least one physical or logical entity as a logical structure that models a real-world asset of the process plant.

30. The communication method of claim 29, wherein storing the object model includes storing a plurality of asset class objects, each asset class object representing a type of a physical asset within the asset environment.

31. The communication method of claim 29, wherein storing the object model includes storing a plurality of location class objects, each location class object representing a type of location within the asset environment.

32. The communication method of claim 29, wherein, storing the object model includes storing a plurality of host class objects, each host class object representing a type of a host machine associated with the asset environment.

33. The communication method of claim 29, wherein storing the object model includes storing a plurality of route class objects, each route class object representing a type of a route within the asset environment.

34. The communication method of claim 29, wherein storing the object model includes storing a plurality of asset class objects, each asset class object representing a type of a physical asset within the asset environment and storing one or more asset object instances for one of the asset class objects, wherein each of the asset object instances includes the features of the one of the asset class objects and includes data defining a particular asset within the asset environment within the feature fields of the asset object instance.

35. The communication method of claim 34, wherein storing the object model includes storing one of the plurality of asset class objects as a sub-class object of another one of the plurality of asset class objects so that the sub-class object includes all of the features of the another one of the plurality of asset class objects.

36. The communication method of claim 35, wherein executing the at least one of the platform services to manage the object model includes enabling the object model to be extended to include one or more additional asset class objects defining additional information about a type of asset in the asset environment.

37. The communication method of claim 35, wherein executing the at least one of the platform services to manage the object model includes enabling the object model to be extended to include additional features for an asset class object.

38. The communication method of claim 37, wherein executing the at least one of the platform services to manage the object model includes storing an indication of an application that extended the object model to include an additional feature in one of the asset class objects within the extended asset class object.

39. The communication method of claim 38, wherein executing the at least one of the platform services to manage the object model includes storing an indication of multiple applications associated with an additional feature of an asset class object that has been extended in the object model.

40. The communication method of claim 38, wherein executing the at least one of the platform services to manage the object model includes limiting access to the additional feature of the extended asset class object or any asset class object instances created therefrom, to one or more applications stored in the asset class object or asset class object instance created therefrom as associated with the additional feature.

41. The communication method of claim 29, further including storing, in a memory, one or more add-on objects, wherein each of the one or more add-on objects includes a set of features defining asset information, and further including associating one of the one or more add-on objects with one or more of the asset class objects or instances of the one or more asset class objects to further define the assets associated with the one or more asset class objects or instances of the one or more asset class objects.

42. The communication method of claim 41, further including storing, for at least one of the asset class objects, a list of add-on objects defining the add-on objects that may be associated with class object instances of the at least one of the asset class objects.

43. The communication method of claim 42, wherein executing the at least one of the platform services to manage the object model includes preventing the association of an add-on object with an asset class object instance of an asset class object when the add-on object is not within the list of add-on objects of the asset class object.

44. The communication method of claim 41, further including storing, in a memory, a list of add-on objects defining the add-on objects that must be associated with class object instances of at least one of the asset class objects.

45. The communication method of claim 29, further including storing, in a memory, one or more relationship definitions, wherein each relationship definition defines a relationship between two or more instances of one or more class objects.

46. The communication method of claim 45, wherein the one or more relationship definitions defines a controlled-by relationship in which an asset associated with a first asset object instance is controlled by an asset associated with a second asset object instance.

47. The communication method of claim 45, wherein the one or more relationship definitions defines an is-controlling relationship in which an asset associated with a first asset object instance is controlling an asset associated with a second asset object instance.

48. The communication method of claim 45, wherein the one or more relationship definitions defines a monitored-by relationship in which an asset associated with a first asset object instance is monitored-by an asset associated with a second asset object instance.

49. The communication method of claim 45, wherein the one or more relationship definitions defines an is-monitoring relationship in which an asset associated with a first asset object instance is monitoring an asset associated with a second asset object instance.

50. The communication method of claim 45, wherein the one or more relationship definitions defines a roll-up relationship in which data from one or more child asset object instances is used by a parent asset object instance.

51. The communication method of claim 45, wherein the one or more relationship definitions defines a relay relationship in which a first asset object instance provides information to a second asset object instance.

52. The communication method of claim 51, wherein the information to be provided from the first asset object instance to the second asset object instance is an alert.

53. The communication method of claim 45, wherein the one or more relationship definitions defines a bound-to relationship in which a first asset object instance is created as a placeholder asset object instance and is able, at a later time, to be bound to a particular asset within the asset environment by obtaining data for the features of the placeholder asset object instance from a data source for data about a the particular asset within the asset environment.

54. The communication method of claim 29, further including storing the object model in a first asset environment, executing the communication interface in the first asset environment, and executing the platform services in the first asset environment, and further including;
    storing a second object model in an electronic memory in a second asset environment, the second object model including one or more class objects, each of the one or more class objects being indicative of a physical or logical entity within the second asset environment, each of the class objects including one or more features defining one or more features of a physical or logical entity within the second asset environment, and feature fields for data to be stored for each of the features;
    executing, via a processor, a second communication interface in the second asset environment to communicate with one or more external applications;
    executing, via a processor, a second multiplicity of platform services in the second asset environment to receive and process messages from the one or more external applications, further including causing one or more of the second multiplicity of platform services to use the second object model to perform actions with respect to messages from the one or more external applications; and
    executing, via a processor, at least one of the second platform services in the second asset environment to manage the second object model by enabling the second object model to be extended to include additional object information defining additional information about physical or logical entities in the second asset environment, wherein the object model is the same as the second object model.

55. An electronic communication system, for use in an asset environment having a plurality of physical assets of different types and uses, the electronic communication system comprising:
a processor;
a memory;
a communication interface;
an object model stored in the memory, the object model including,
   a plurality of asset objects, each of the plurality of asset objects being indicative of a physical asset within the asset environment having a plurality of physical assets of different types and uses, and including one or more features defining one or more features of an asset within the asset environment, and
   one or more relationship definitions, each of the one or more relationship definitions indicating a relationship between two or more asset objects; and
a multiplicity of platform services coupled to the communication interface that execute on the processor to receive and process messages from one or more applications received via the communication interface,
wherein one or more of the multiplicity of platform services uses the object model to perform actions with respect to messages from the one or more applications, and
wherein at least one of the platform services operates as an extender application to manage the object model during use by enabling the object model to be extended to include additional relationship definitions,
wherein the asset environment defines an asset environment of a process plant, and wherein the extender application modifies the object model to classify at least one physical or logical entity as a logical structure that models a real-world asset of the process plant.

56. The electronic communication system of claim 55, wherein the plurality of asset objects includes one or more asset class objects and one or more asset class object instances derived from one of the one or more asset class objects, wherein each of the asset class objects is indicative of a type of asset and includes one or more features defining one or more features of the type of asset, and wherein each of the asset class object instances includes each of the feature fields of the asset class object from which it is derived and includes data within each of the feature fields defining a particular asset in the asset environment.

57. The electronic communication system of claim 56, wherein one of the relationship definitions defines a relationship between two of the asset class object instances.

58. The electronic communication system of claim 55, wherein one of the relationship definitions defines a relationship between two asset class objects.

59. The electronic communication system of claim 55, wherein one of the relationship definitions defines a relationship between an asset class object and an asset class object instance.

60. The electronic communication system of claim 55, wherein the relationship definition includes an indication of a type of relationship and includes a relationship pair, wherein each member of the relationship pair defines one or more asset objects.

61. The electronic communication system of claim 60, wherein one of the relationship definitions defines a controlled-by relationship in which an asset associated with a first asset object is controlled by an asset associated with a second asset object.

62. The electronic communication system of claim 60, wherein one of the relationship definitions defines an is-controlling relationship in which an asset associated with a first asset object is controlling an asset associated with a second asset object.

63. The electronic communication system of claim 60, wherein one of the relationship definitions defines a monitored-by relationship in which an asset associated with a first asset object is monitored by an asset associated with a second asset object.

64. The electronic communication system of claim 60, wherein one of the relationship definitions defines an is-monitoring relationship in which an asset associated with a first asset object is monitoring an asset associated with a second asset object.

65. The electronic communication system of claim 60, wherein one of the relationship definitions defines a roll-up relationship in which data from one or more child asset objects is to be used by a parent asset object for a particular purpose.

66. The electronic communication system of claim 60, wherein one of the relationship definitions defines a relay relationship in which a first asset object provides information to a second asset object.

67. The electronic communication system of claim 66, wherein the information from the first asset object to the second asset object is an alert.

68. The electronic communication system of claim 60, wherein one of the relationship definitions defines a bound-to relationship in which a first asset object is created as a placeholder asset object and is enabled to be, at a later time, bound to a particular asset within the asset environment by obtaining data for the features of the placeholder asset object from a source of data for a particular asset within the asset environment.

69. The electronic communication system of claim 55, wherein the platform services manages the object model by enabling the one or more relationship definitions to be changed in the object model in response to a change in an asset object of the object model.

70. The electronic communication system of claim 69, wherein the platform services changes a parent-child relationship for an asset object when the asset object is moved in the object model.

71. The electronic communication system of claim 69, wherein the platform services changes a roll-up relationship for an asset object when the asset object is moved to indicate a roll-up to a new parent asset object.

72. The electronic communication system of claim 69, wherein the platform services changes a parent-child relationship for a copied asset object when an asset object is duplicated and moved, and further deletes all other relationships for the copied asset object.

73. The electronic communication system of claim 69, wherein the platform services deletes all relationships associated with an asset object when the asset object is deleted from the object model.

74. An electronic communication system, for use in an environment having a plurality of physical assets of different types and uses, the electronic communication system comprising:

a processor;

a memory;

a communication interface;

an object model stored in the memory, the object model including one or more class objects, each of the one or more class objects being indicative of a physical or logical entity within the asset environment, each of the class objects including one or more features defining one or more aspects of a physical or logical entity within the asset environment, and feature fields indicating data to be stored for each of the features; and a multiplicity of platform services coupled to the communication interface that execute on the processor to receive and process messages from one or more applications, wherein one or more of the multiplicity of platform services uses the object model to perform actions with respect to the messages from the one or more applications, wherein at least one of the platform services manages the object model by enabling the object model to be extended to include additional object information defining additional information about physical or logical entities in the asset environment, wherein the object model includes one or more add-on objects, wherein each of the one or more add-on objects includes a set of features defining asset information, and wherein one or more of the add-on objects is associated with one or more of the asset class objects or instances of the one or more asset class objects to further define the asset associated with the one or more asset class objects or instances of the one or more asset class objects, wherein at least one of the asset class objects includes a list of add-on objects defining the add-on objects that may be associated with asset class object instances of the at least one of the asset class objects, and wherein the one of the platform services that manages the object model prevents the association of an add-on object with an asset class object instance of an asset class object when the add-on object is not within the list of add-on objects of the asset class object.

75. An electronic communication system, for use in an environment having a plurality of physical assets of different types and uses, the electronic communication system comprising:

a processor;

a memory;

a communication interface;

an object model stored in the memory, the object model including one or more class objects, each of the one or more class objects being indicative of a physical or logical entity within the asset environment, each of the class objects including one or more features defining one or more aspects of a physical or logical entity within the asset environment, and feature fields indicating data to be stored for each of the features;

a multiplicity of platform services coupled to the communication interface that execute on the processor to receive and process messages from one or more applications, wherein one or more of the multiplicity of platform services uses the object model to perform actions with respect to the messages from the one or more applications, wherein at least one of the platform services manages the object model by enabling the object model to be extended to include additional object information defining additional information about physical or logical entities in the asset environment; and a first asset environment and a second asset environment, wherein the processor, the memory, the object model, and the multiplicity of platform services are located at the first asset environment, and wherein the second asset environment includes a second processor; a second memory; a second communication interface; a second object model stored in the second memory, the second object model including one or more class objects, each of the one or more class objects being indicative of a physical or logical entity within the second asset environment, each of the class objects including one or more features defining one or more aspects of a physical or logical entity within the second asset environment, and feature fields indicating data to be stored for each of the features; and a second multiplicity of platform services coupled to the second communication interface that execute on the second processor to receive and process messages from one or more applications, wherein one or more of the second multiplicity of platform services uses the second object model to perform actions with respect to the messages from the one or more applications, and wherein at least one of the second platform services manages the second object model by enabling the second object model to be extended to include additional object information defining additional information about physical or logical entities in the second asset environment, and wherein the object model is the same as the second object model.

76. The electronic communication system of claim 75, wherein the object model and the second object model are identical in a pre-extended state.

77. The electronic communication system of claim 75, wherein the object model and the second object model include the same class object hierarchy and naming convention in a pre-extended state.

78. A method of performing communications in an electronic communication system supporting an environment having a plurality of physical assets of different types and uses, the communication method comprising:

storing an object model in an electronic memory, the object model including one or more class objects, each of the one or more class objects being indicative of a physical or logical entity within the asset environment, each of the class objects including one or more features defining one or more features of a physical or logical entity within the asset environment, and feature fields for data to be stored for each of the features;

executing, via a processor, a communication interface to communicate with one or more external applications;

executing, via a processor, a multiplicity of platform services to receive and process messages from the one or more external applications, further including causing one or more of the multiplicity of platform services to use the object model to perform actions with respect to messages from the one or more external applications;

executing, via a processor, at least one of the platform services to manage the object model by enabling the object model to be extended to include additional object information defining additional information about physical or logical entities in the asset environment;

storing, in a memory, one or more add-on objects, wherein each of the one or more add-on objects includes a set of features defining asset information, and further including associating one of the one or more add-on objects with one or more of the asset class objects or instances of the one or more asset class objects to further define the assets associated with the one or more asset class objects or instances of the one or more asset class objects; and storing, for at least one of the asset class objects, a list of add-on objects defining the add-on objects that may be associated with class object instances of the at least one of the asset class objects, wherein executing the at least one of the platform services to manage the object model includes preventing the association of an add-on object with an asset class object instance of an asset class object when the add-on object is not within the list of add-on objects of the asset class object.

79. A method of performing communications in an electronic communication system supporting an environment having a plurality of physical assets of different types and uses, the communication method comprising:

storing an object model in an electronic memory, the object model including one or more class objects, each of the one or more class objects being indicative of a physical or logical entity within the asset environment, each of the class objects including one or more features defining one or more features of a physical or logical entity within the asset environment, and feature fields for data to be stored for each of the features;

executing, via a processor, a communication interface to communicate with one or more external applications;

executing, via a processor, a multiplicity of platform services to receive and process messages from the one or more external applications, further including causing one or more of the multiplicity of platform services to use the object model to perform actions with respect to messages from the one or more external applications;

executing, via a processor, at least one of the platform services to manage the object model by enabling the object model to be extended to include additional object information defining additional information about physical or logical entities in the asset environment;

storing the object model in a first asset environment, executing the communication interface in the first asset environment, and executing the platform services in the first asset environment, and further including;

storing a second object model in an electronic memory in a second asset environment, the second object model including one or more class objects, each of the one or more class objects being indicative of a physical or logical entity within the second asset environment, each of the class objects including one or more features defining one or more features of a physical or logical entity within the second asset environment, and feature fields for data to be stored for each of the features;

executing, via a processor, a second communication interface in the second asset environment to communicate with one or more external applications;

executing, via a processor, a second multiplicity of platform services in the second asset environment to receive and process messages from the one or more external applications, further including causing one or more of the second multiplicity of platform services to use the second object model to perform actions with respect to messages from the one or more external applications; and executing, via a processor, at least one of the second platform services in the second asset environment to manage the second object model by enabling the second object model to be extended to include additional object information defining additional information about physical or logical entities in the second asset environment, wherein the object model is the same as the second object model.

* * * * *